(12) United States Patent
Isogai et al.

(10) Patent No.: US 6,371,476 B2
(45) Date of Patent: *Apr. 16, 2002

(54) IMAGE PRODUCING APPARATUS WHEREIN A PAPER FEED UNIT AND A PAPER STACK ARE ARRANGED IN A VERTICAL DIRECTION

(75) Inventors: Yoshitaka Isogai, Kawasaki; Yoshihiro Ichi, Toyokawa, both of (JP); Henry Chin, Portland, OR (US); Steve McCallion, Portland, OR (US); Scott Thorpe, Portland, OR (US); Peter Wyatt, Los Angeles, CA (US)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/049,019

(22) Filed: Mar. 27, 1998

(51) Int. Cl.[7] .................................. B65H 5/22
(52) U.S. Cl. .................... 271/3.14; 271/9.01; 271/9.11; 271/9.12; 271/9.13
(58) Field of Search ............... 271/9.01, 9.06, 271/9.11, 9.12, 9.13, 289, 290, 4.01, 3.14, 149

(56) References Cited

U.S. PATENT DOCUMENTS

| | | | | |
|---|---|---|---|---|
| 4,053,152 A | * | 10/1977 | Marsumoto | 271/9 |
| 4,627,706 A | * | 12/1986 | Takahashi et al. | 399/363 |
| 4,777,365 A | * | 10/1988 | Torii et al. | 271/3.1 X |
| 4,806,758 A | * | 2/1989 | Yoshimura et al. | 250/327.2 |
| 5,029,933 A | * | 7/1991 | Tani et al. | 271/9 |
| 5,065,995 A | * | 11/1991 | Iwamoto et al. | 271/9 |
| 5,083,761 A | | 1/1992 | Johdai et al. | |
| 5,204,727 A | * | 4/1993 | Haneda et al. | 355/321 |
| 5,416,570 A | * | 5/1995 | Kondou | 355/321 |
| 5,485,990 A | * | 1/1996 | Kato | 271/9.08 |
| 5,550,623 A | * | 8/1996 | Tomita et al. | 355/311 |
| 5,599,117 A | * | 2/1997 | Faes et al. | 271/9.01 X |
| 5,860,644 A | * | 1/1999 | Takeuchi et al. | 271/4.01 |
| 6,067,425 A | * | 5/2000 | Takarabe et al. | 399/1 |

FOREIGN PATENT DOCUMENTS

| | | | |
|---|---|---|---|
| JP | 04080176 | | 3/1992 |
| JP | 04080177 | | 3/1992 |
| JP | 04333063 A | * | 11/1992 |
| JP | 06046191 A | * | 2/1994 |

\* cited by examiner

Primary Examiner—David H. Bollinger
(74) Attorney, Agent, or Firm—McDermott, Will, & Emery

(57) ABSTRACT

An image reading apparatus comprises a vertical type paper feed unit which feed paper into a printing unit, and a discharge unit which contains the paper discharged from the printing unit. The paper feed unit and the discharged unit are arranged in a vertical direction to the printing unit, which will allow the floor surface projection area to be reduced. Further, the paper is conveyed into one of discharge trays in accordance with its paper size. Thereby, the larger size paper is discharged underside the smaller size paper, accordingly, it does not occur for the paper discharged to the upper discharge tray to shield the paper on the lower stage discharge tray from the visual angle. Also, the confirmation of paper discharge and taking out can be easily carried out irrespective of the paper size.

21 Claims, 27 Drawing Sheets

F I G. 4 (a)
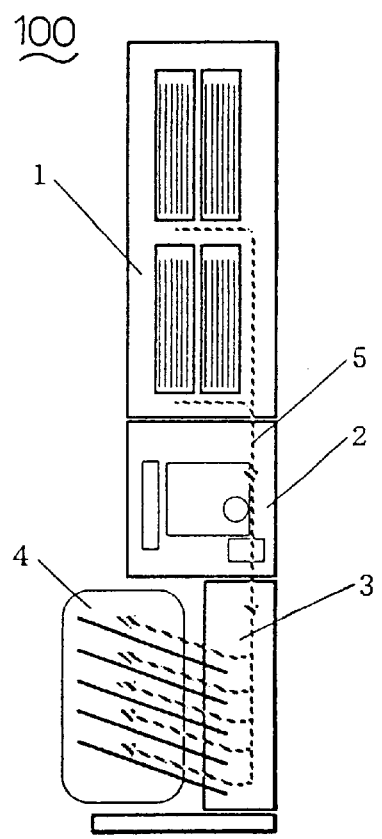
F I G. 4 (b)
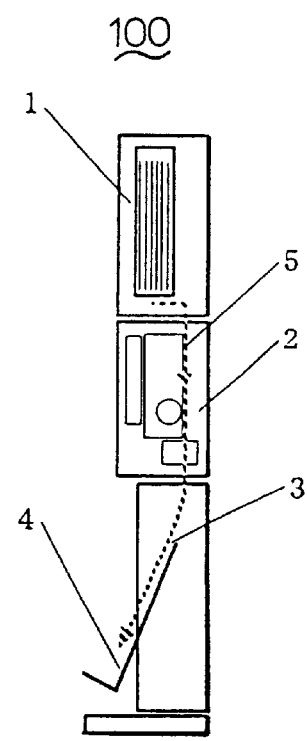

FIG. 12 (a)
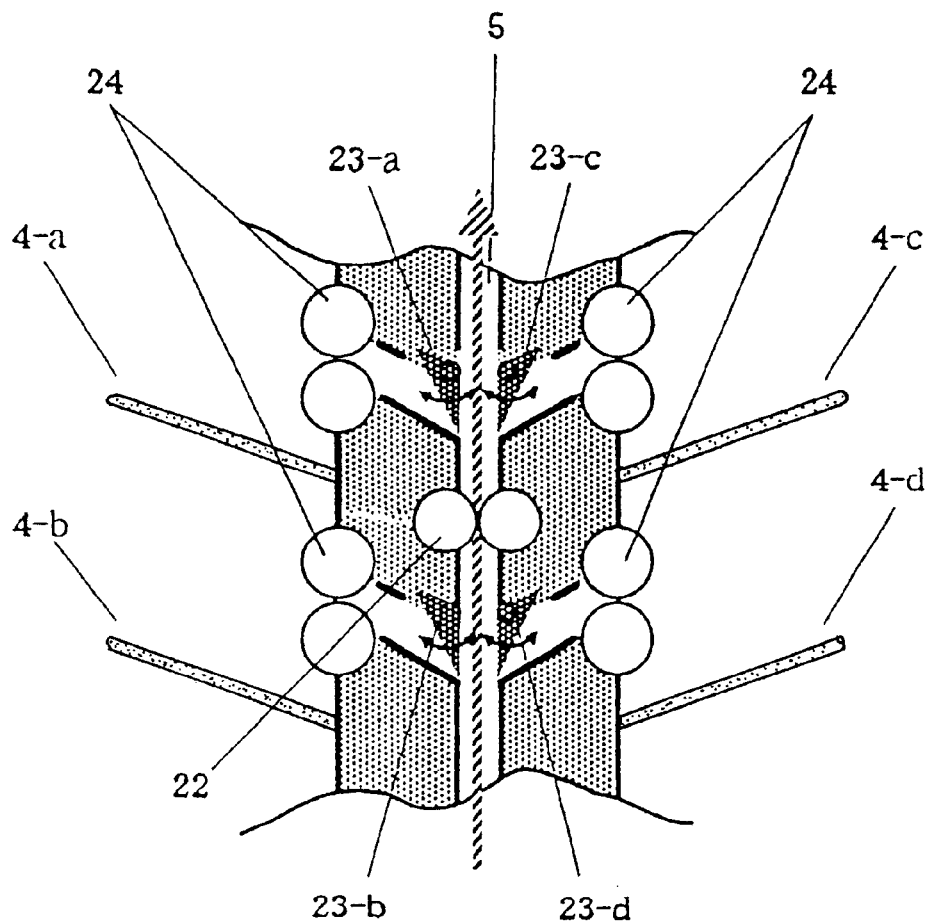
FIG. 12 (b)     FIG. 12 (c)
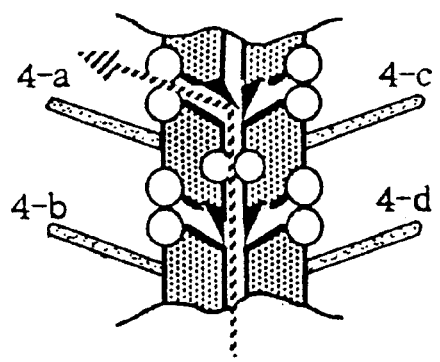 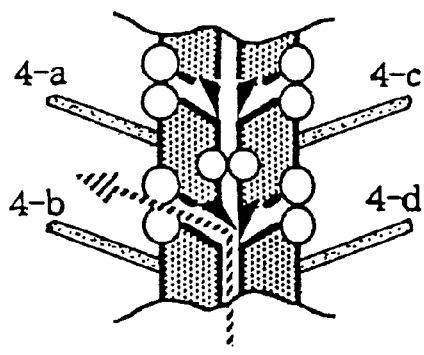

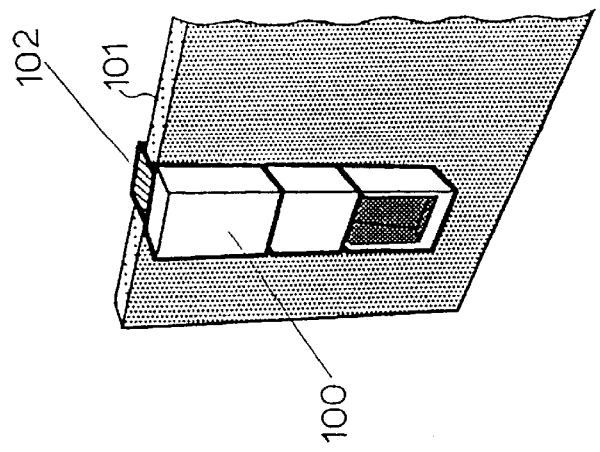
F I G. 17 (a)
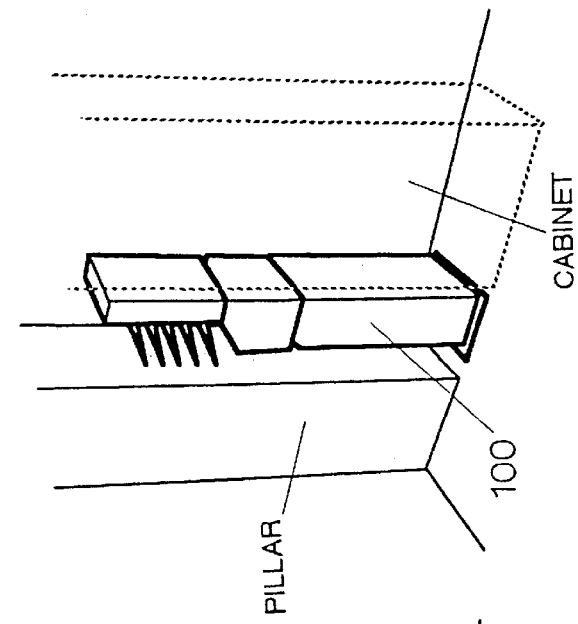
F I G. 17 (b)
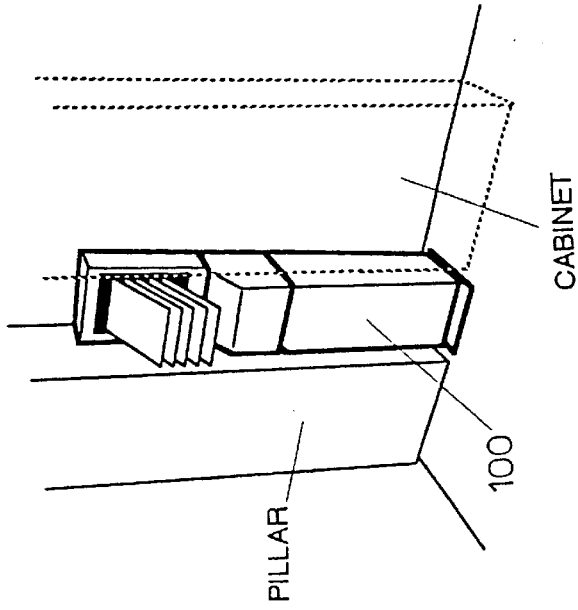
F I G. 17 (c)

IMAGE PRODUCING APPARATUS WHEREIN A PAPER FEED UNIT AND A PAPER STACK ARE ARRANGED IN A VERTICAL DIRECTION

BACKGROUND OF THE INVENTION

The present invention relates to an image producing apparatus wherein a paper feed unit and a paper stack are arranged in a vertical direction, especially that provided with a sorter to be used for paper discharge/sorting, applicable to a printer, copier, etc. for copying and printing.

In the conventional printer, there is known a technique having a constitution wherein the printing apparatus/paper feed apparatus/sorter are laid in vertical direction to reduce the area for installation. In the paper discharge apparatus equipped in the conventional printer or copier with sorter, there is known a technique to provide a U-type notch on the paper discharge tray to facilitate confirmation of small sized paper discharge or taking out such paper.

However, in the conventional printer or copier as above, because the paper containing is made in horizontal direction in the paper feeding apparatus, there is a problem that the installation area cannot be reduced any further, and the place of installation is limited.

Also, in the sorter of ordinary copier, large size paper (A3, 11"×17", etc.) discharged to the upper paper discharge tray is to cover the paper discharge tray on the lower stage from the visual angle, and interrupts confirmation and taking out of the small size paper discharge discharged in the paper discharge tray on the lower stage. Furthermore, in a sorter of an ordinary copier, when a large volume of the large sized paper is discharged in the upper paper discharge tray, the center of gravity of the sorter is deviated upward, thereby providing a liability to fall.

SUMMARY OF THE INVENTION

An object of the present invention is to provide an image producing apparatus wherein the floor surface projection area can be reduced and the freedom of the place of installation can be enlarged. Moreover, it is to provide an image producing apparatus with sorter wherein the confirmation of paper discharge and taking out can be easily carried out irrespective of the paper size, and the apparatus is less liable to fall even in case of the discharge of the large size paper in a large volume.

According to one aspect of the present invention, an image producing apparatus wherein a paper feed unit and a paper stack are arranged in a vertical direction, comprising: an image producing unit which produces images on paper; a vertical type paper feed unit which is located in a vertical direction to the image producing unit, and feeds the paper to the image producing unit, wherein the paper are contained in an upright position; and, a paper stack which is located in a vertical direction of the image producing unit, and contains the paper discharged from the image producing unit.

In this constitution, because the projection area on the floor surface in the paper contained state in the paper feed unit can be constricted, the floor surface projection area for installation of apparatus can be reduced, thereby providing the greater freedom for the installation place.

According to another aspect of the present invention, an image producing apparatus wherein a paper feed unit and paper stack are arranged in a vertical direction, comprising: an image producing unit which produces an image on paper fed from the paper feed unit; a paper stack which consists of a plurality of trays arranged in upward and downward direction, a paper conveying path in which the paper discharged from the image producing unit, are conveyed to each of the trays, and a paper conveying device which conveys the paper discharged from the image producing unit; and, a control device which specifies one of said plurality of trays in response to a paper size, and controls the paper conveying device so as to convey the paper into the specified tray.

In this constitution, it is possible to constitute so that, of the paper up to the maximum printable size, the larger size paper is discharged underside the smaller size paper at all times. Therefore, it does not occur for the paper discharged to the upper paper discharge tray to shield the paper on the lower stage discharge tray from the visual angle. Accordingly, without respect to the paper size, confirmation of paper discharge and taking out can be easily performed. Also, as it is possible to arrange so that the heavier weight larger sized paper discharge tray is positioned underneath, and the heavier weight larger sized paper is always discharged downward, the center of gravity of the sorter does not deflect upward. Accordingly, even if the large size paper is discharged in a large volume, the apparatus is less apt to fall.

BRIEF DESCRIPTION OF THE DRAWINGS

FIGS. 4(a) and 4(b) are the vertical sectional views of the printer according to the fourth embodiment of the invention.

FIG. 12(a) is a vertical sectional view of the distribution device in the paper discharge unit, and FIGS. 12(b) and 12(c) are the vertical sectional views to show the action of the distribution device.

FIG. 17(a) is a perspective view of the printer according to the fourteenth embodiment showing the condition of installation in which the paper passing direction is made vertical to the front face of the machine, FIG. 17(b) is a perspective view of the same in which the paper passing direction is made horizontal to the front face of the machine, and FIG. 17(c) is a perspective view of the same in which the main body of the machine is suspended from the partition or the like.

DETAILED DESCRIPTION OF THE PREFERRED EMBODIMENT OF THE PRESENT INVENTION

Figure 1:
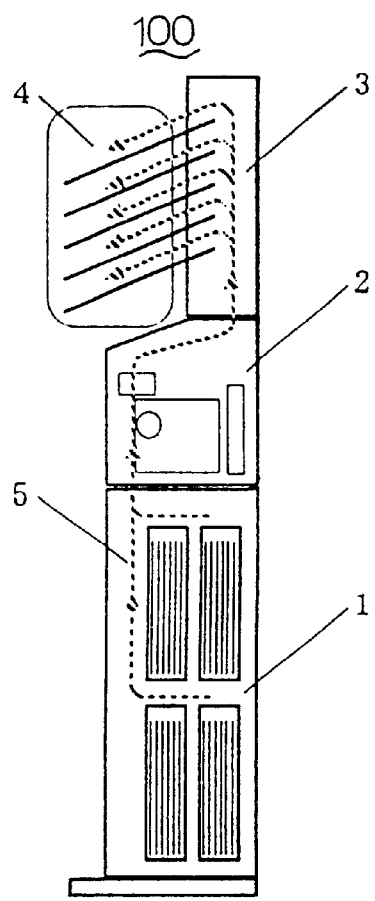
FIGS. 1(a) and 1(b) are the vertical sectional views of the printer according to the first embodiment of the invention.
Figure 1:
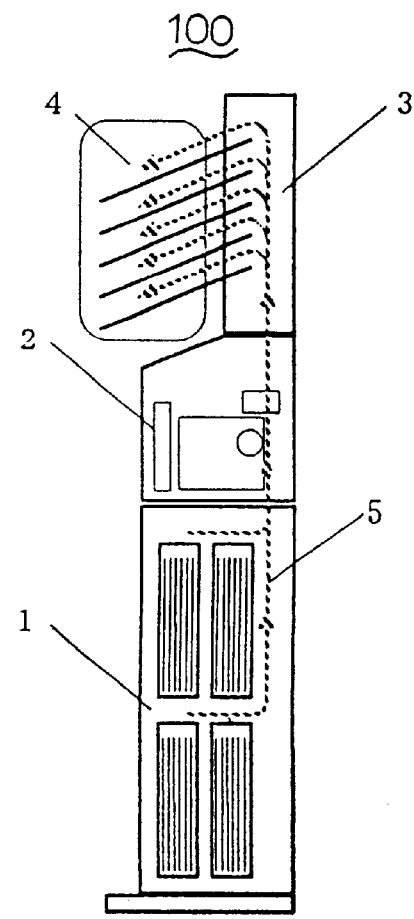

Hereinafter, preferred embodiments of the present invention will be described with reference to the accompanying drawings. FIGS. 1(a) and 1(b) show the constitution of the printer according to the first embodiment. The printer 100 comprises a printing unit (image producing unit) 2 which is provided in the main body and designed to produce an image on the paper by laser system or the like, a vertical type paper feed unit 1 which is arranged in a position of vertical direction to the printing unit 2 for feeding paper to the printing unit 2, and a discharge unit (paper stack) 3 which is arranged in a position of vertical direction to the printing unit 2 and having a discharge tray 4 for containing the paper discharged from the printing unit 2. In this embodiment, the printing unit 2 is arranged on the paper feed unit 1, and the discharge unit 3 is arranged on the printing unit 2. In the paper feed unit 1, the paper is contained and fed in a vertical direction. In the figure, according to the paper passage route 5 as shown in the dotted line, the paper discharged from the paper feed unit 1 passes through the printing unit 2, is carried to the discharge unit 3, and discharged to the discharge tray 4. The paper passage route 5 from the paper feed unit 1 to the printing unit 2 is led through the front side of the main body in FIG. 1(a), and through the rear side of the main body in FIG. 1(b).

Figure 2:
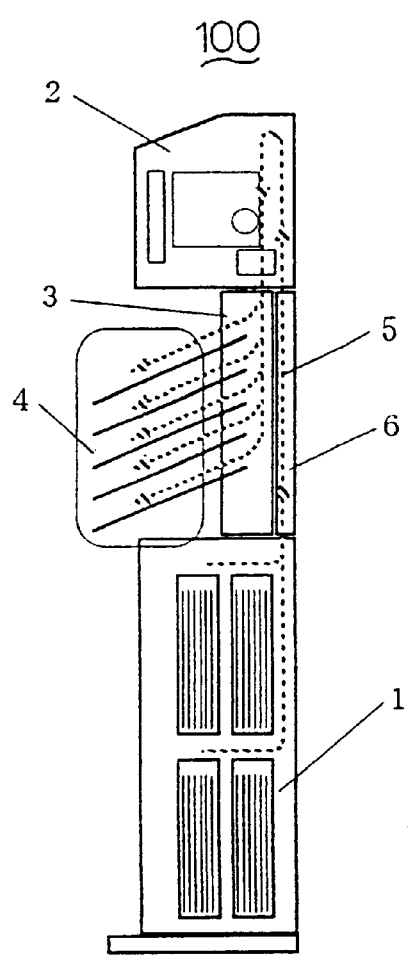
FIG. 2 is a vertical sectional view of the printer according to the second embodiment of the invention.

FIG. 2 shows the constitution of the printer according to the second embodiment. In this printer 100, a discharge unit 3 is arranged on the paper feed unit 1, and a printing unit 2 on the discharge unit 3. In the paper feed unit 1, the paper is contained in the vertical direction and fed. In the figure, as in the paper passage route 5 shown in the dotted line, the paper which is discharged from the paper feed unit 1 is passed through the vertical conveying route 6, conveyed to the printing unit 2, printed, and then conveyed to the discharge unit 3, and discharged to the discharge tray 4.

Figure 3:
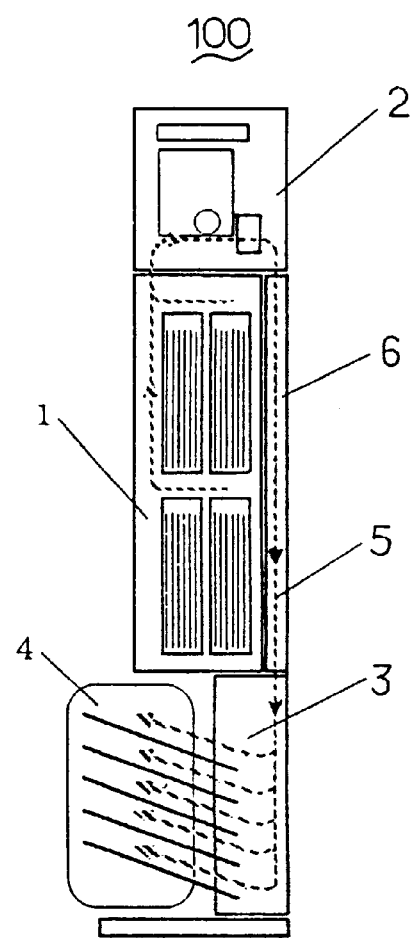
FIG. 3 is a vertical sectional view-of the printer according to the third embodiment of the invention.

FIG. 3 shows a constitution of the printer according to the third embodiment. In this printer 100, the paper feed unit 1 is arranged on the discharge unit 3, and the printing unit 2 is arranged on the paper feed unit 1. In the paper feed unit 1, the paper is contained in the vertical direction and fed. In the figure, as in the paper passage route 5 shown in the dotted line, the paper which is discharged from the paper feed unit 1 is conveyed to the printing unit 2, printed, and then passed through the vertical conveying route 6, conveyed to the discharge unit 3, and discharged to the discharge tray 4.

FIGS. 4(a) and 4(b) show a constitution of the printer according to the fourth embodiment. In this printer 100, the printing unit 2 is arranged on the discharge unit 3, and the paper feed unit 1 is arranged on the printing unit 2. In the paper feed unit 1, the paper is contained in the vertical direction and fed. In the figure, as in the paper passage route 5 shown in the dotted line, the paper which is discharged from the paper feed unit 1 is conveyed to the printing unit 2, printed, and then conveyed to the discharge unit 3, and discharged to the discharge tray 4.

Figure 5:
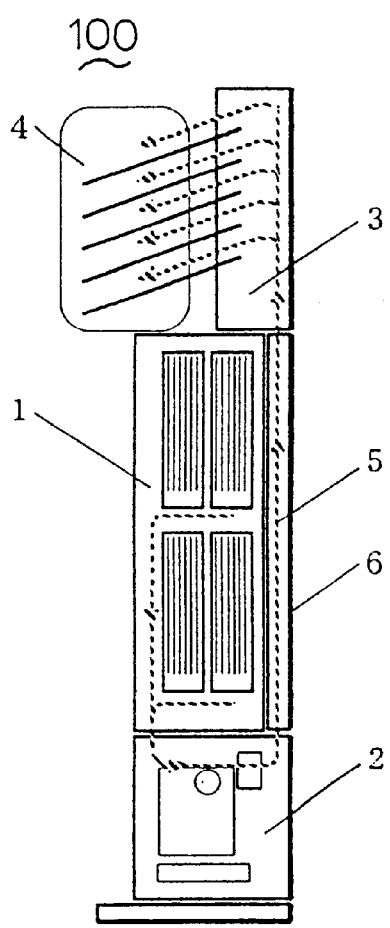
FIG. 5 is a vertical sectional view of the printer according to the fifth embodiment of the invention.

FIG. 5 shows a constitution of the printer according to the fifth embodiment. In this printer 100, the paper feed unit 1 is arranged on the printing unit 2, and the discharge unit 3 is arranged on the paper feed unit 1. In the paper feed unit 1, the paper is contained in the vertical direction and fed. In the figure, as in the paper passage route 5 shown in the dotted line, the paper which is discharged from the paper feed unit 1 is conveyed to the printing unit 2, printed, and then passed through the vertical conveying route 6, conveyed to the discharge unit 3, and discharged to the discharge tray 4.

Figure 6:
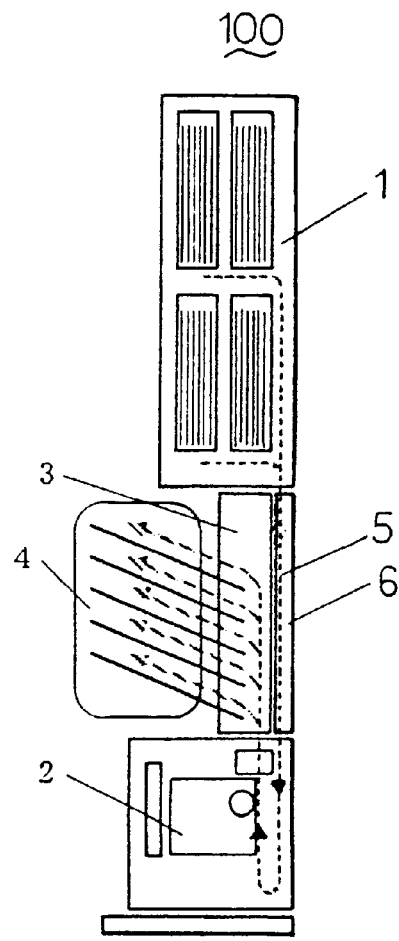
FIG. 6 is a vertical sectional view of the printer according to the sixth embodiment of the invention.

FIG. 6 shows a constitution of the printer according to the sixth embodiment. In this printer 100, the discharge unit 3 is arranged on the printing unit 2, and the paper feed unit 1 is arranged on the discharge unit 3. In the paper feed unit 1, the paper is contained in the vertical direction and fed. In the figure, as in the paper passage route 5 shown in the dotted line, the paper which is discharged from the paper feed unit 1 is passed through the vertical conveying route 6, conveyed to the printing unit 2, printed, and then conveyed to the discharge unit 3, and discharged to the discharge tray 4.

Figure 7:
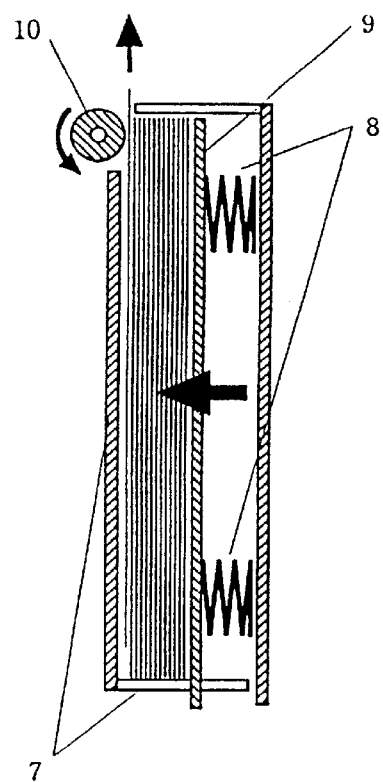
FIGS. 7(a), 7(b), 7(c) and 7(d) are the sectional views of the paper feed units in the printer according to the seventh embodiment of the invention.
Figure 7:
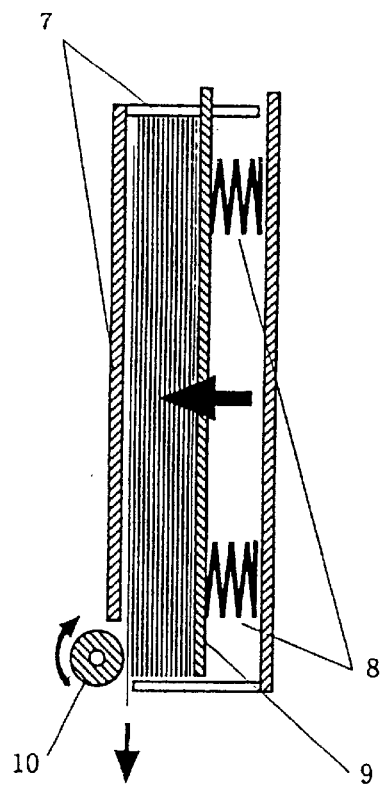
Figure 7:
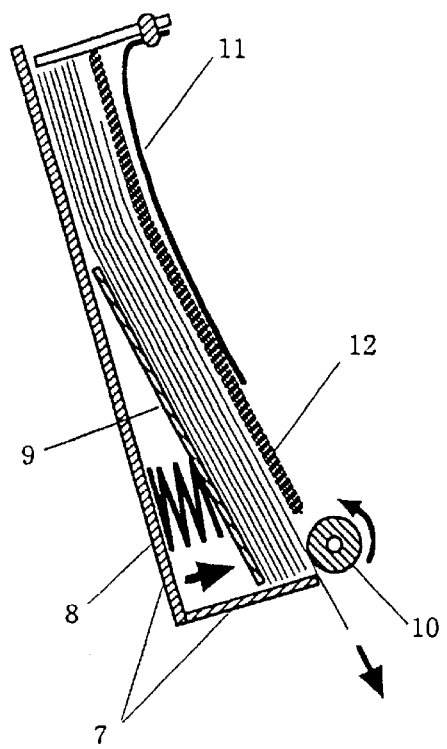
Figure 7:
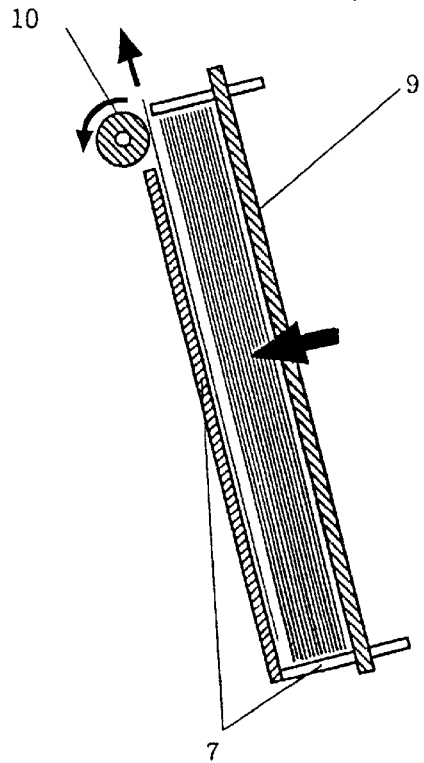

FIGS. 7(*a*)–7(*d*) show the constitution of the paper feed unit in the printer according to the seventh embodiment. The paper feeding unit shown in FIGS. 7 (*a*) and 7(*b*) has a containing base plate 7 for keeping the paper in a vertical direction, and by pressing the pressure plate 9 to the containing base plate 7 side by the pressing device 8, the paper is pressed to fix in the containing base plate 7 to keep the upright held condition. The paper is fed sheet by sheet upward or downward by the shuffling device 10. The paper feed unit shown in FIG. 7(*c*) is to contain the paper in the vertical direction in the containing base plate 7 which is slightly inclined from the vertical direction. By pressing the pressure plate 12 by a pressing device 11 such as a leaf spring, the paper is pressed to fix in the containing base plate 7 to be held in an upright condition. Also, by pushing up the pressure plate 9 by the pressing device 8 from the opposite side of the paper, the paper is pressed to the shuffling device 10 side to guide the paper to the shuffling means 10. The paper is fed sheet by sheet by the shuffling device 10. The paper feed unit shown in FIG. 7(*d*) is similarly to contain the paper in the containing base plate 7 which is slightly inclined from the vertical direction. By pressing the paper to the containing base plate 7 side by the self weight of the pressure plate 9, the paper is pressed to fix in the containing base plate 7 to be held in an upright condition. The paper is fed sheet by sheet by the shuffling device 10.

Figure 8:
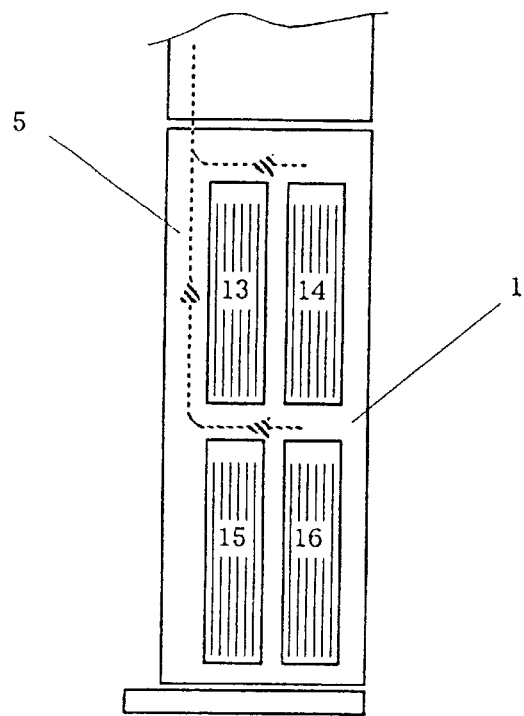
FIGS. 8(a) and 8(b) are the vertical sectional views of the paper feed units in the printer according to the eighth embodiment of the invention.
Figure 8:
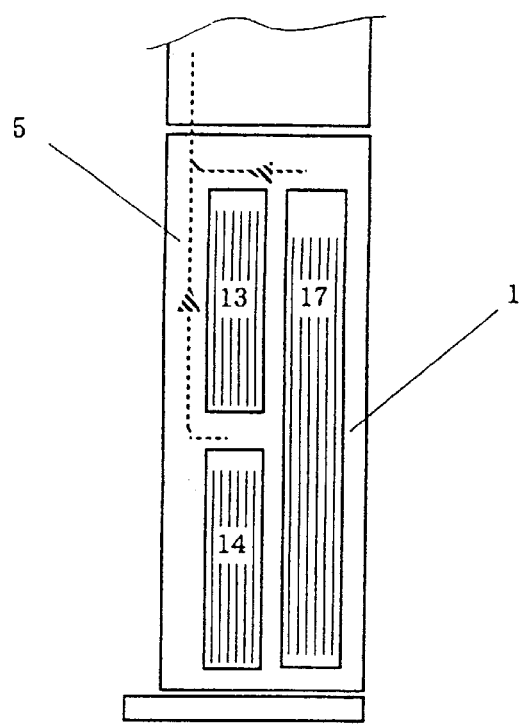

FIGS. 8(*a*) and 8(*b*) show the constitution of the paper feed unit in case of the printer having a plurality of paper feed trays according to the eighth embodiment. The paper feed unit 1 shown in FIG. 8(*a*) is provided with the paper feed trays 13–16 which can contain and feed paper individually, so that the number of the paper feed trays can be increased or decreased according to the differences of the number of papers or kinds of paper. In the paper feed unit 1 shown in FIG. 8(*b*), a paper feed tray 17 for large size is arranged in the space corresponding to the upper and lower two stages of the paper feed trays 13, 14 for small size paper, so that the large size paper can be fed.

Figure 9:
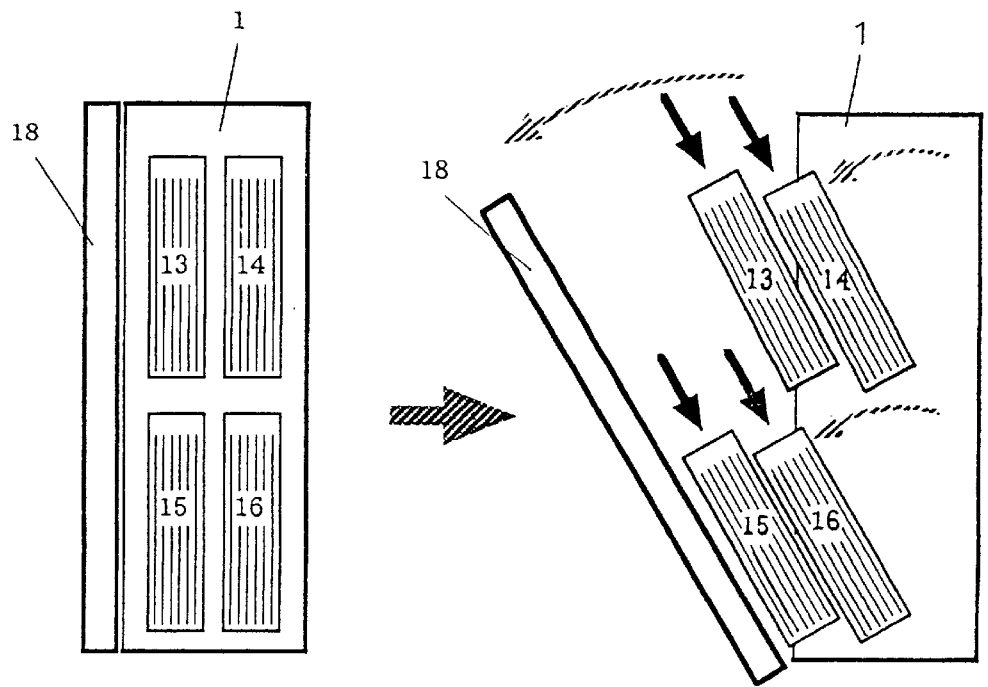
FIG. 9(a) is an illustrative view of constitution of the paper feed unit in the printer according to the ninth embodiment of the invention.
FIGS. 9(b) and 9(c) are the views to show the action of the front door of the paper feed unit.
Figure 9:
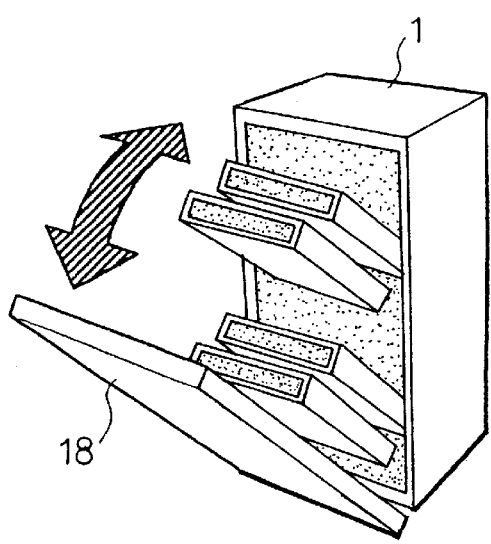
Figure 9:
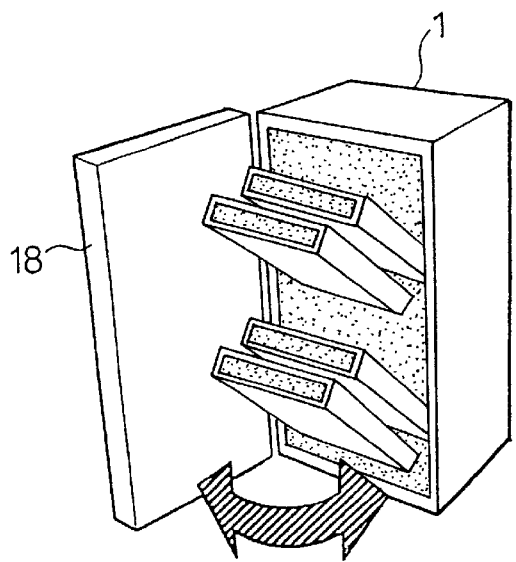

FIGS. 9(*a*), 9(*b*) and 9(*c*) show the constitution of the paper feed unit in the printer according to the ninth embodiment and the method of replenishing paper to the paper feed unit 1. In FIGS. 9(*a*) and 9(*b*), the paper feed unit 1 is provided with a front door (cover) 18 which can be opened forward, and in its inside there are arranged the paper feed trays 13–16 which can contain and feed paper individually. The paper feed trays 13–16 are rotatable forward on the axis of the point near the bottom part. When the front door 18 is opened, the respective trays fall forward with inclination, and their top openings are exposed. The paper can be inserted in the respective paper feed tray through the opening (solid line, arrow mark direction). In FIG. 9(*c*), the direction for the front door 18 to open is different from that described above.

Figure 10:
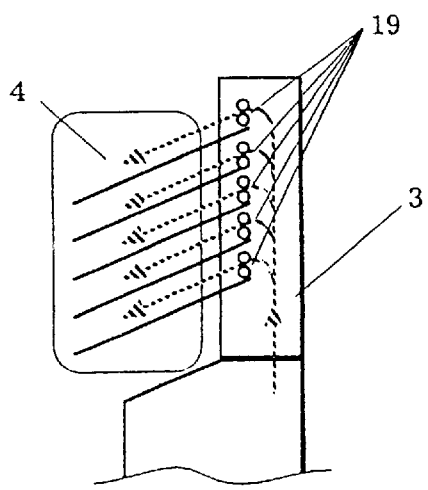
FIGS. 10(a), 10(b), 10(c) and 10(d) are the vertical sectional views of the paper discharge units in the printer according to the tenth embodiment of the invention.
Figure 10:
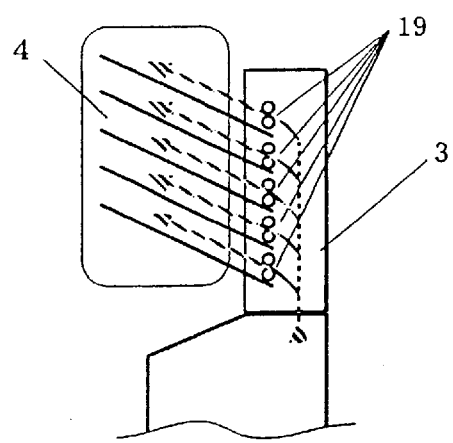
Figure 10:
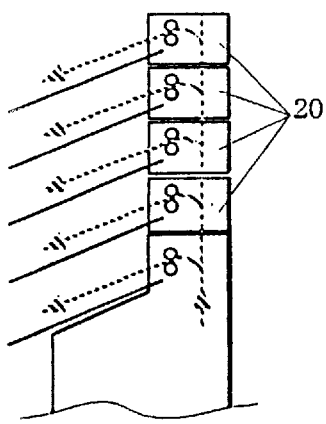
Figure 10:
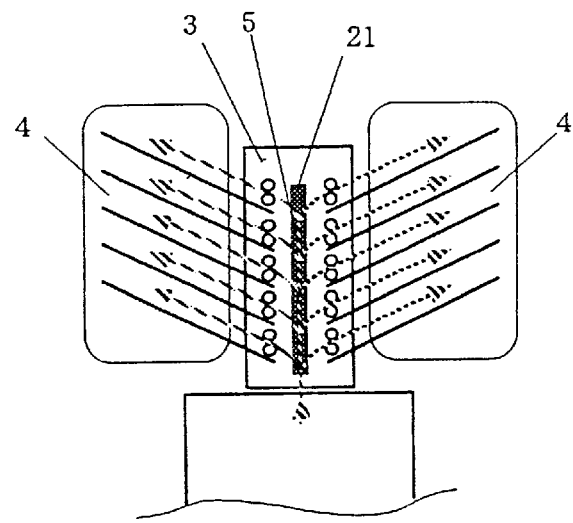

FIG. 10 to FIG. 13 show the constitution examples of the discharge tray in the discharge unit 3 of the printer according to the tenth embodiment. In the example of FIG. 10(*a*), the discharge tray 4, which can discharge and contain paper individually respectively is arranged in a form that the front end, is directed downward externally from the discharge port 19, by which the paper is aligned to the tray front end side by its own weight after the paper discharge. In the example of FIG. 10(*b*), the discharge tray 4 which can individually discharge and contain paper is arranged in a form that the front end is directed upward externally from the paper discharge port 19, by which the paper is aligned to the tray rear end side by own weight after the paper discharge. In the example of FIG. 10(*c*), the discharge tray units 20 which can individually discharge and contain paper (corresponding to the first unit and second unit in claim) are arranged. These discharge tray units 20 are respectively independent, so that they are increased by the required number by connecting in a vertical direction.

Figure 11:
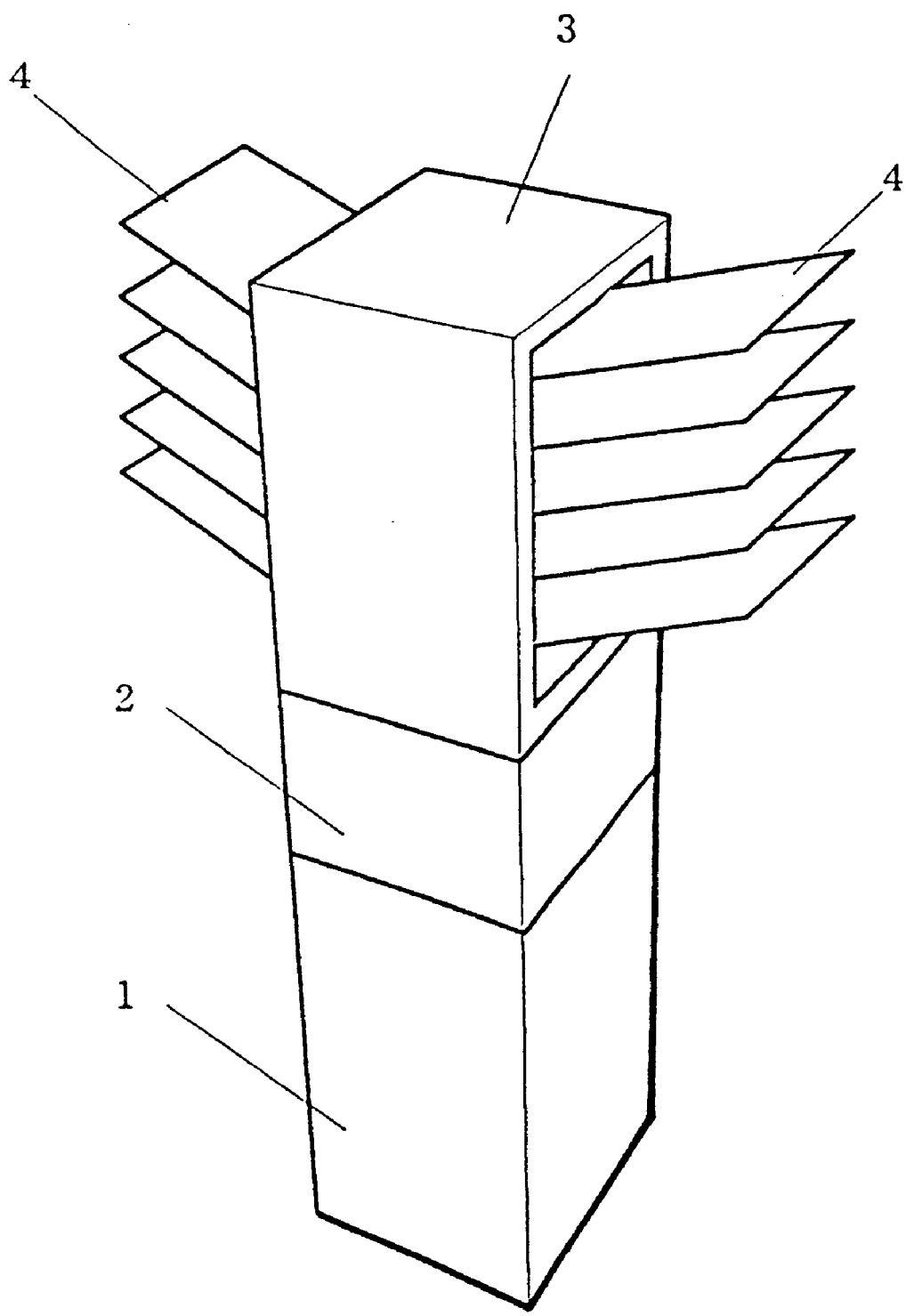
FIG. 11 is a perspective view of the printer according to the tenth embodiment.

In the example of FIG. 10(*d*), the discharge trays 4 which can individually discharge and contain paper are arranged on both sides of the discharge unit 3. The paper is discharged to the respective discharge trays by means of the distributing device 21 arranged in the paper passage route 5. FIG. 11 is a perspective view of the constitution of FIG. 10(*d*). In FIG. 12(*a*), there is shown an example of constitution of the distributing device 21. The printed paper is conveyed from the lower part to the paper passage route 5 and then upward by the conveying roller 22, as shown in the arrow mark in the drawing. On the paper passage route 5, the changeover vanes 23*a*–23*d* are provided. They display the functions of blocking and opening the paper passage route 5 by changing the positions centering on the axis of rotation. The paper which has led through the paper passage route 5 is advanced to the prescribed direction according to the positions of these changeover vanes, and discharged to the respective discharge trays 4*a*–4*d*. FIG. 12(*b*) shows an example of operation of the distributing device 21, which shows the case of discharging paper to the discharge tray 4*a*. The movements of the respective changeover vanes are: changeover vane 23*a*=closed, changeover vane 23*b*=open, changeover vane 23*c*=open, and changeover vane 23*d*=open. The paper is led through the paper passage route, it collides against the changeover vane 23*a* to change the direction, and is discharged to the discharge tray 4*a*. FIG. 12(*c*) shows the case of discharging paper to the discharge tray 4*b*. The movements of the respective changeover vanes are: changeover vane 23*a*=open, changeover vane 23*b*=closed, changeover vane 23*c*=open, and changeover vane 23*d*=open. The paper is led through the paper passage route, it collides against the changeover vane 23*b* to change the direction, and is discharged to the discharge tray 4*b*. Similar sequences apply to the cases of discharging paper to the other discharge trays 4*c*, 4*d*.

Figure 13:
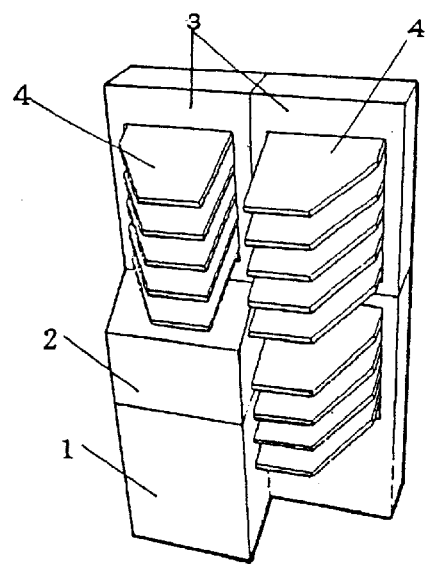
FIG. 13(a) is a perspective view of an example in which the paper discharge units are arranged in parallel.
FIG. 13(b) is a vertical sectional view of the paper discharge unit on the printing unit side in the same constitution.
FIG. 13(c) is a vertical sectional view of the paper discharge unit side in the same constitution.
FIG. 13(d) is a horizontal sectional view of the paper discharge unit in the same constitution.
Figure 13:
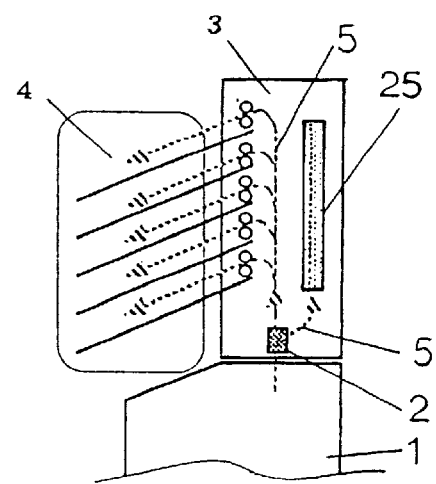
Figure 13:
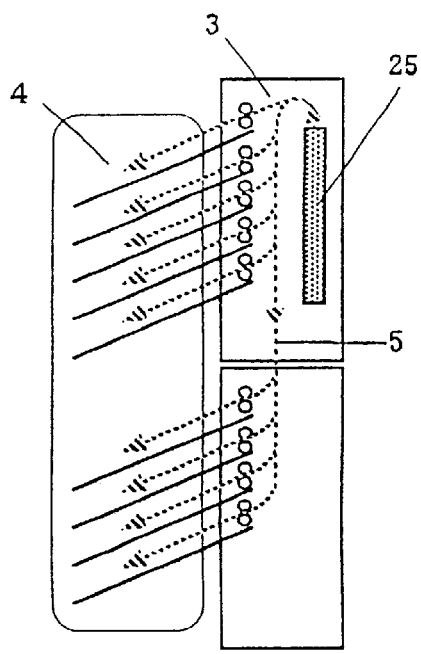
Figure 13:
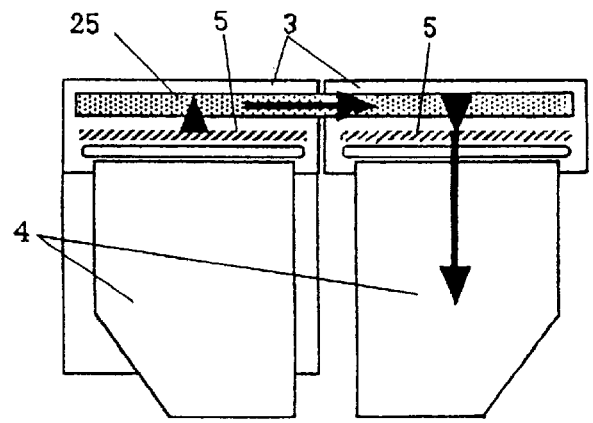

FIGS. 13(*a*), 13(*b*), 13(*c*) and 13(*d*) show the cases of constituting the discharge unit 3 in parallel arrangements, being respectively the perspective view, vertical sectional view of the discharge unit on the printing unit side, vertical sectional view of the discharge unit side, and cross sectional view of the discharge unit. Inside the discharge unit 3, on the back side of the paper passage route 5, a horizontal conveying device 25 is arranged. In case of discharging paper to the discharge unit 3 arranged in parallel mode, the paper is conveyed from the printing unit 2 to the inside of the discharge unit 3 and to the horizontal conveying device 25 by the distributing device 21 (FIG. 10(*d*)). Further, after being conveyed to the discharge unit 3 arranged in parallel by the horizontal conveying means 25, the paper is discharged to the respective discharge trays 4 through the paper passage route 5.

Figure 14:
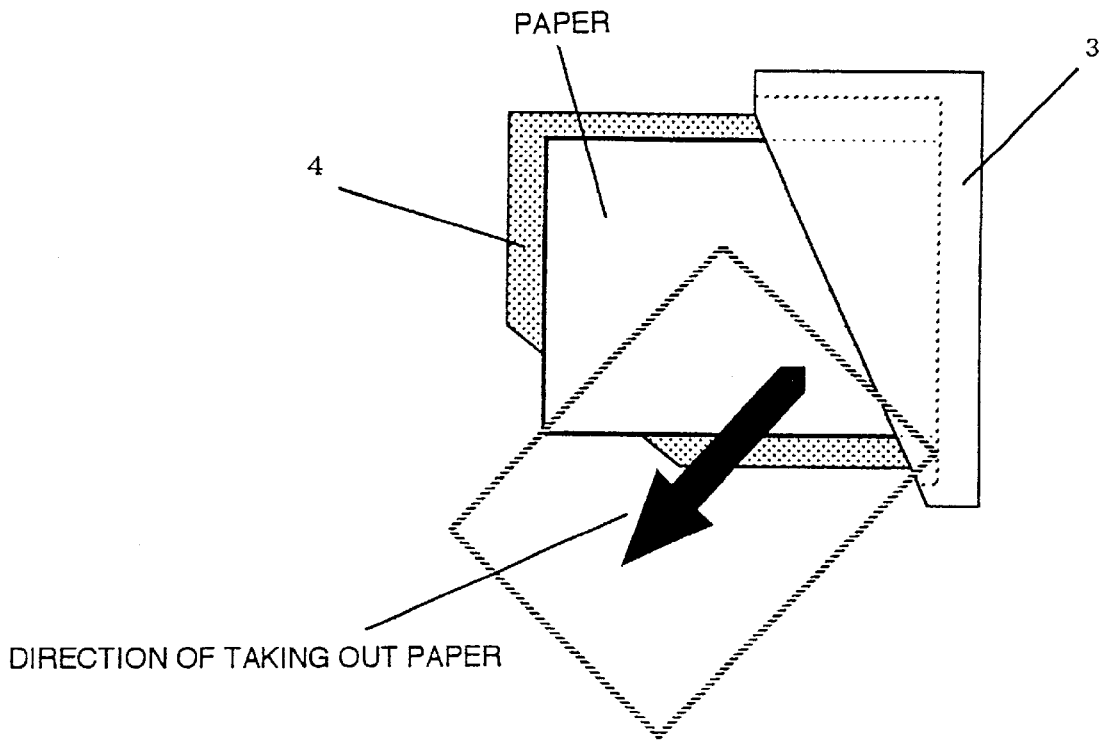
FIGS. 14(a) and 14(b) are top views of the printer of the eleventh embodiment showing the constitution of the main body of the paper discharge unit notched at its top face and front face.
Figure 14:
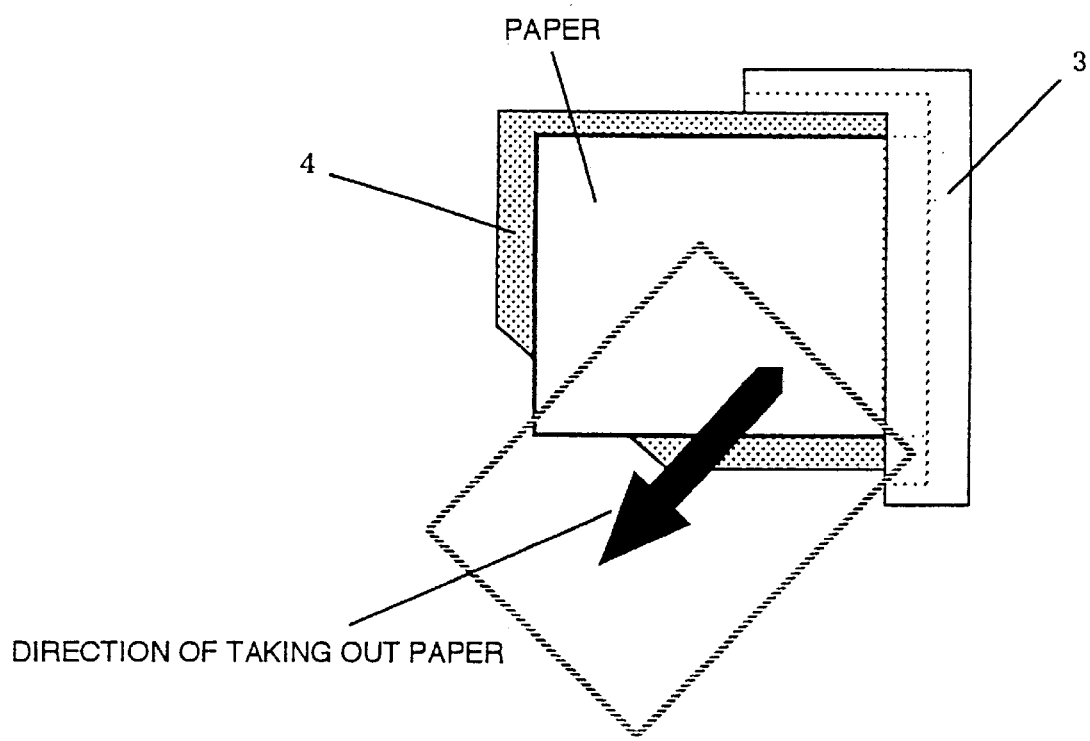

FIGS. 14(*a*) and 14(*b*) show the constitution examples of the discharge unit of the printer according to the eleventh embodiment, wherein FIG. 14(*a*) shows the front part of the main body of the discharge unit 3 in notched condition. The discharge unit 3 has a cover to cover the lateral side of the tray along the direction of the paper discharge. This cover is formed such that the side provided with the notch of the tray is shorter than the other side. FIG. 14(b) shows the top side and front part of the main body of the discharge unit 3 being notched. The arrow mark shows the taking out direction in paper discharge. By this constitution, the discharged paper is made easy to take out.

Figure 15:
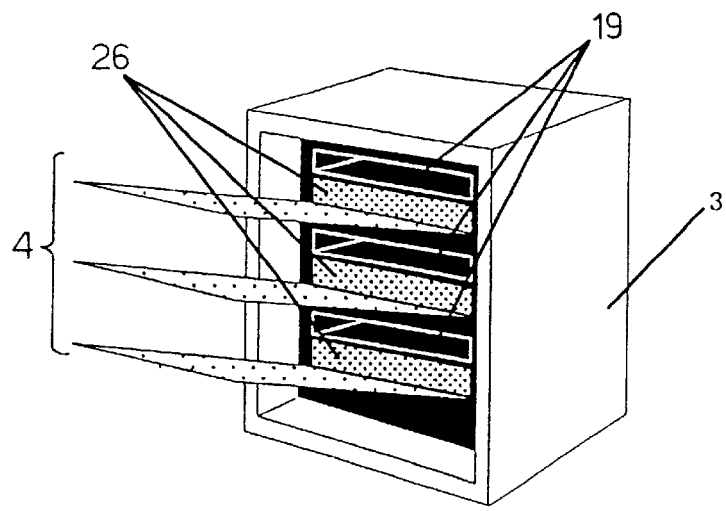
FIG. 15(a) is a perspective view of the paper discharge unit in the printer according to the twelfth embodiment.
FIG. 15(b) is a horizontal sectional view of the paper discharge unit of the same.
FIG. 15(c) is a horizontal sectional view of the paper discharge unit of the same showing the condition of taking out the discharged paper.
Figure 15:
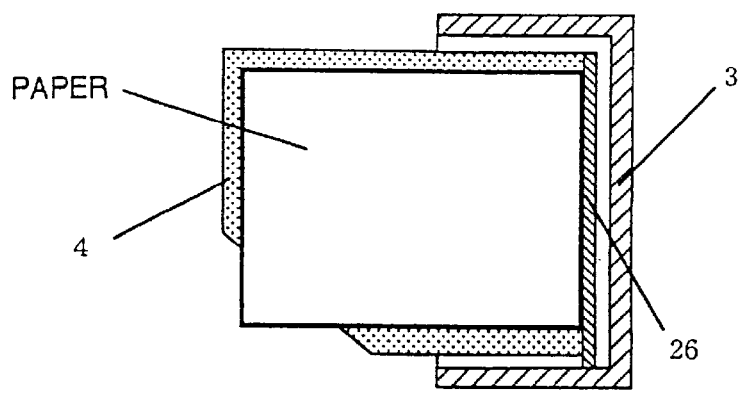
Figure 15:
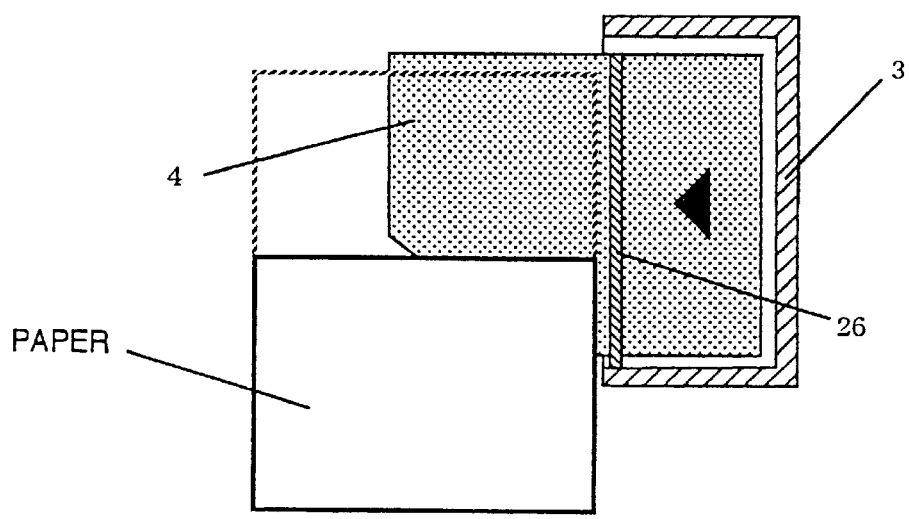

FIGS. 15(a), 15(b) and 15(c) show the constitution examples of the discharge unit of the printer according to the twelfth embodiment, wherein there is provided an extrusion bar 26 for extruding the discharge paper from the main body of the discharge unit 3 to the paper discharge port 19. The non-illustrated control unit compares the size of the discharged paper with the size of the containing tray, and drives the non-illustrated drive mechanism to move the extrusion bar 26 by a predetermined amount. By this extrusion, taking the discharged paper is facilitated.

Figure 16:
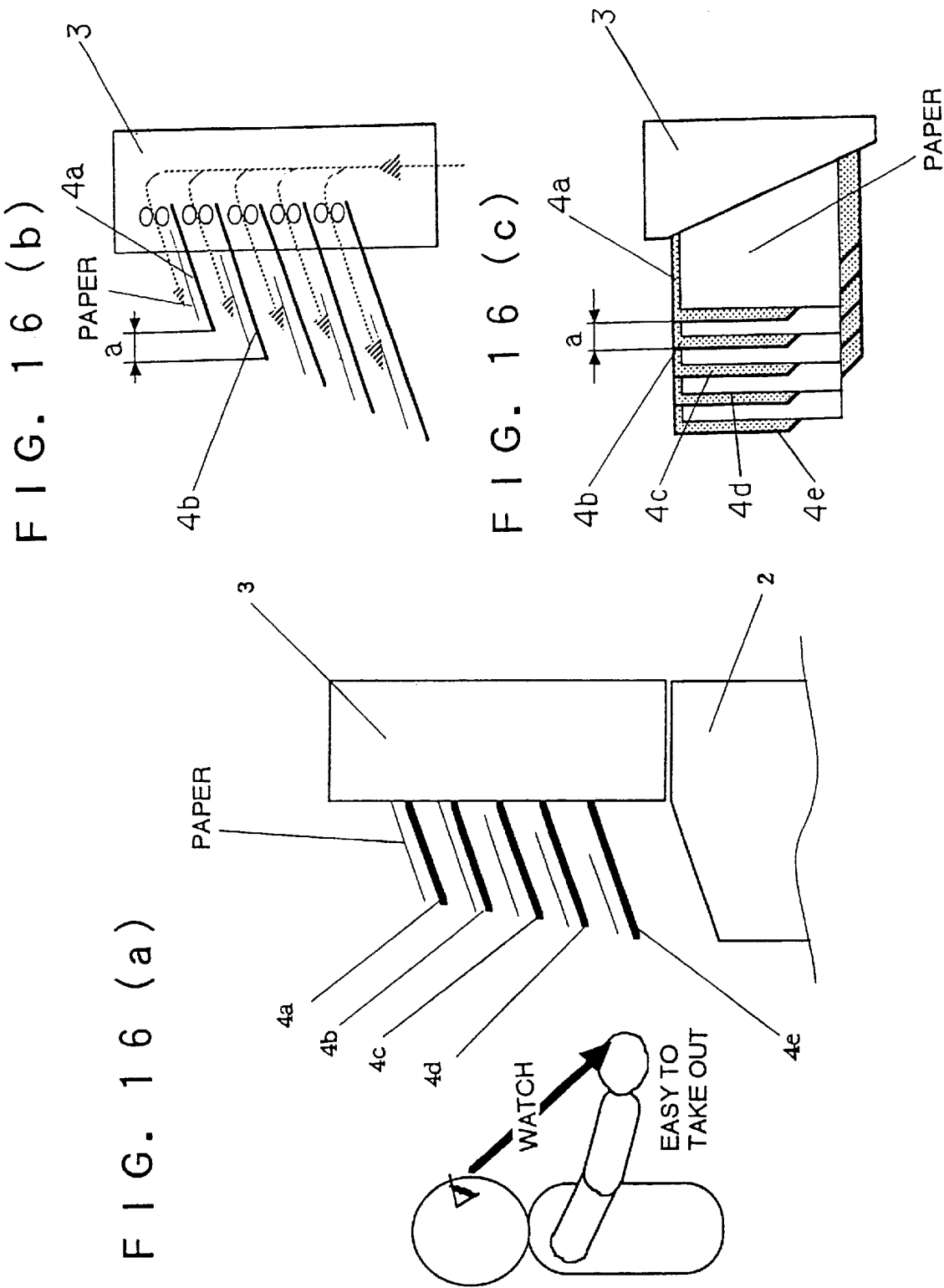
FIG. 16(a) is a side view of the multi-tray in the printer according to the thirteenth embodiment.
FIG. 16(b) is a vertical sectional view of the same multi-tray.
FIG. 16(c) is a top face view of the same multi-tray.

FIGS. 16(a), 16(b) and 16(c) show the constitution examples of the discharge unit of the printer according to the thirteenth embodiment, wherein there is shown a multi-tray which is easy for taking paper and is highly visible. The multi-trays 4a–4e are capable of discharging and containing the paper individually respectively. Each of these trays is arranged in downward disposition, so that the lower tray is positioned forward in comparison with the upper tray. The paper which passed through the discharge unit 3 is discharged and then aligned to the front end of the tray by its own weight. The multi-trays 4a–4e are each provided with a notch at the front end side, and the papers on each tray are arranged in the easily visible distance (size a).

FIGS. 17(a), 17(b) and 17(c) show the installation examples of the printer according to the fourteenth embodiment, wherein FIG. 17(a) shows the condition of installation in which the paper passing direction is set to be vertical to the front of the printer 100, FIG. 17(b) shows the condition of installation in which the paper passing direction is set to be horizontal to the front of the printer 100, and FIG. 17(c) shows the condition in which the printer 100 is suspended from the partition wall 101 with a hanging device 102.

In the following paragraphs there is described an embodiment in a printer having a sorter in which the paper taking out is facilitated by distributing the discharge tray to be used according to the paper size.

Figure 18:
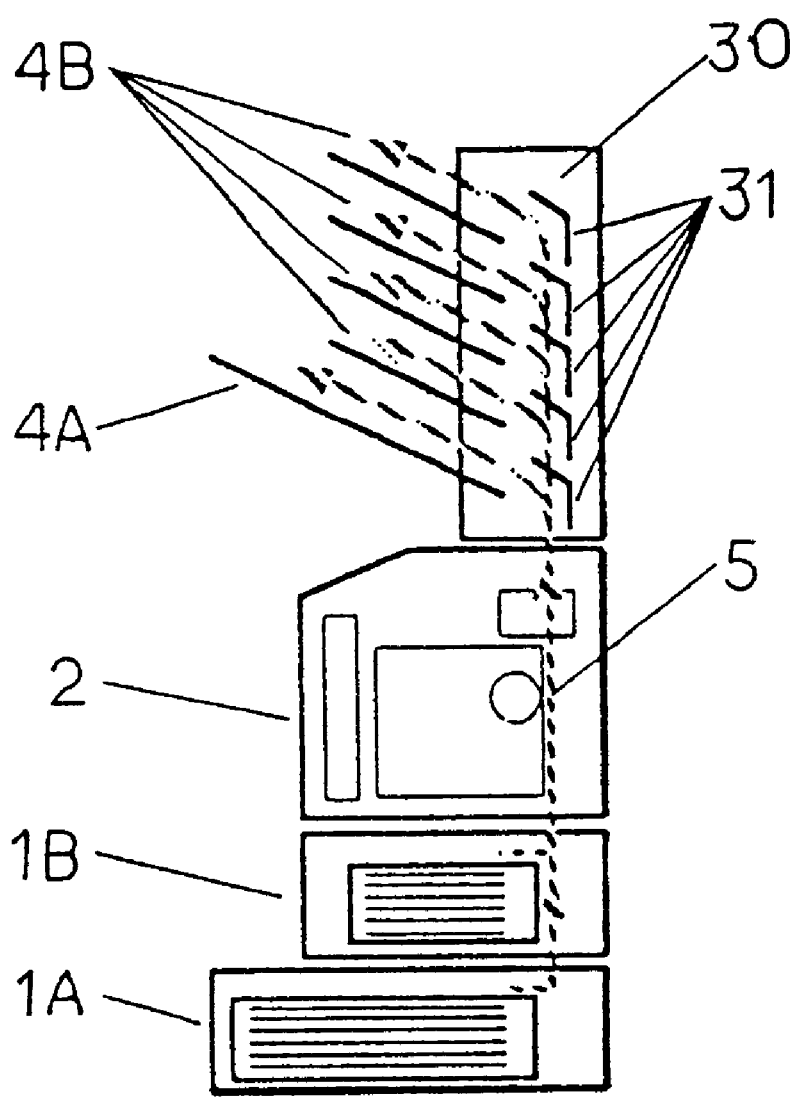
FIG. 18 is a vertical sectional view of the printer according to the fifteenth embodiment of the invention.

FIG. 18 shows a printer according to the fifteenth embodiment. A printing unit 2 is arranged on the paper feed unit (large) 1A and the paper feed unit (small) 1B. At the top of them the sorter 30 is arranged. As in the paper passing route 5 shown in the dotted line, the paper which is discharged from the paper feed unit is led through the printing unit 2, conveyed to the sorter 30, and further automatically distributed to the discharge tray (small) 4B and the discharge tray (large) 4A to meet the paper size by the distributor 31.

Figure 19:
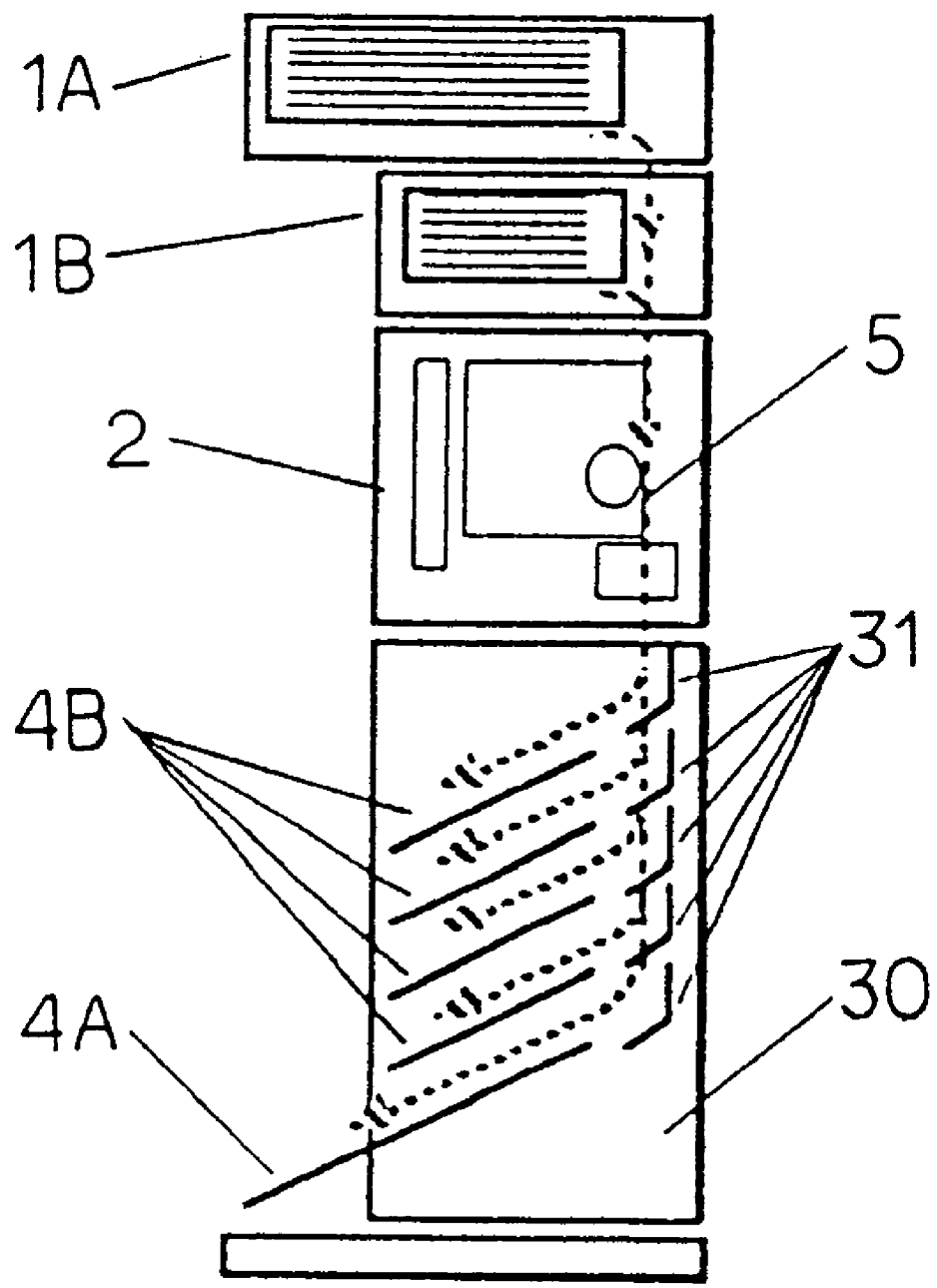
FIG. 19 is a vertical sectional view of the printer according to the sixteenth embodiment of the invention.

FIG. 19 shows the printer according to the sixteenth embodiment. The printing unit 3 is arranged under the paper feed unit (large) 1A and paper feed unit (small) 1B, and the sorter 30 is arranged under the printing unit 2. As in the paper passing route 5 shown in the dotted line, the paper which is discharged from the paper feed unit is led through the printing unit 2, conveyed to the sorter 30, and automatically distributed to the discharge tray (small) 4B and the discharge tray (large) 4A to meet the paper size by the distributor 31.

Figure 20:
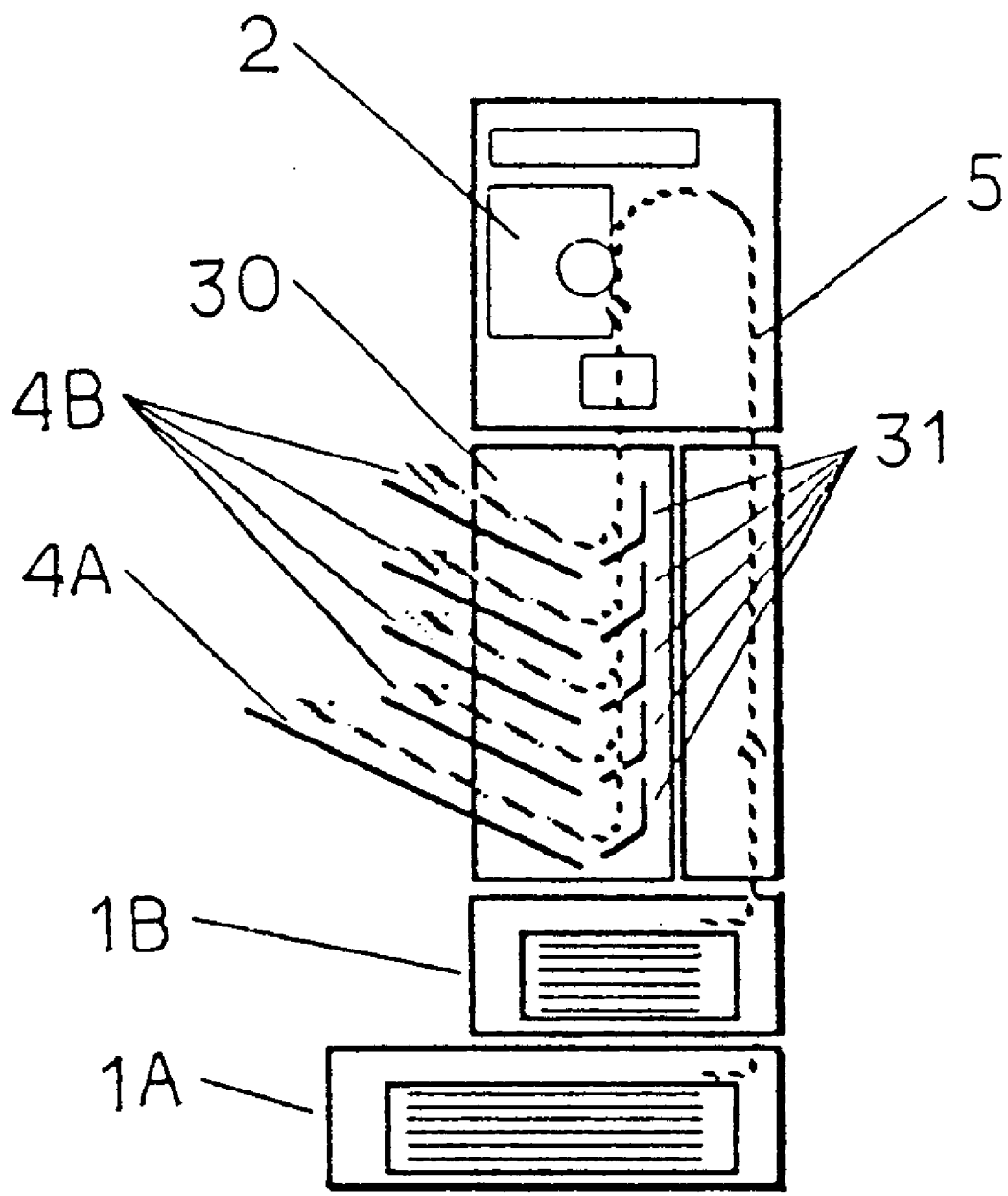
FIG. 20 is a vertical sectional view of the printer according to the seventeenth embodiment of the invention.

FIG. 20 shows the printer according to the seventeenth embodiment. The sorter 30 is arranged between the paper feed units 1A, 1B and the printing unit 2. As in the paper passing route 5 shown in the dotted line, the paper which is discharged from the paper feed unit is led through the printing unit 2, conveyed to the sorter 30, and automatically distributed to the discharge tray (small) 4B and the discharge tray (large) 4A to meet the paper size by the distributor 31.

Figure 21:
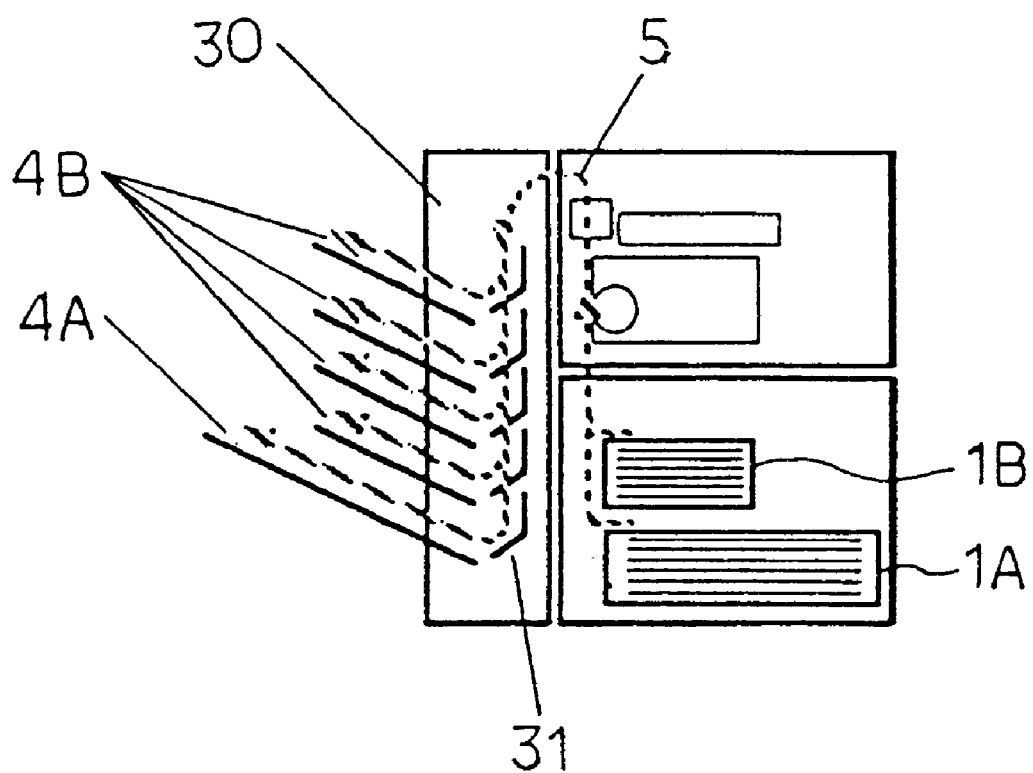
FIG. 21 is a vertical sectional view of the printer according to the eighteenth embodiment of the invention.

FIG. 21 shows the printer according to the eighteenth embodiment. The sorter 30 is arranged on the side of the paper feed units 1A, 1B and the printing unit 2. As in the paper passing route 5 shown in the dotted line, the paper which is discharged from the paper feed unit is led through the printing unit 2, conveyed to the sorter 30, and automatically distributed to the discharge tray (small) 4B and the discharge tray (large) 4A to meet the paper size by the distributor 31.

Figure 22:
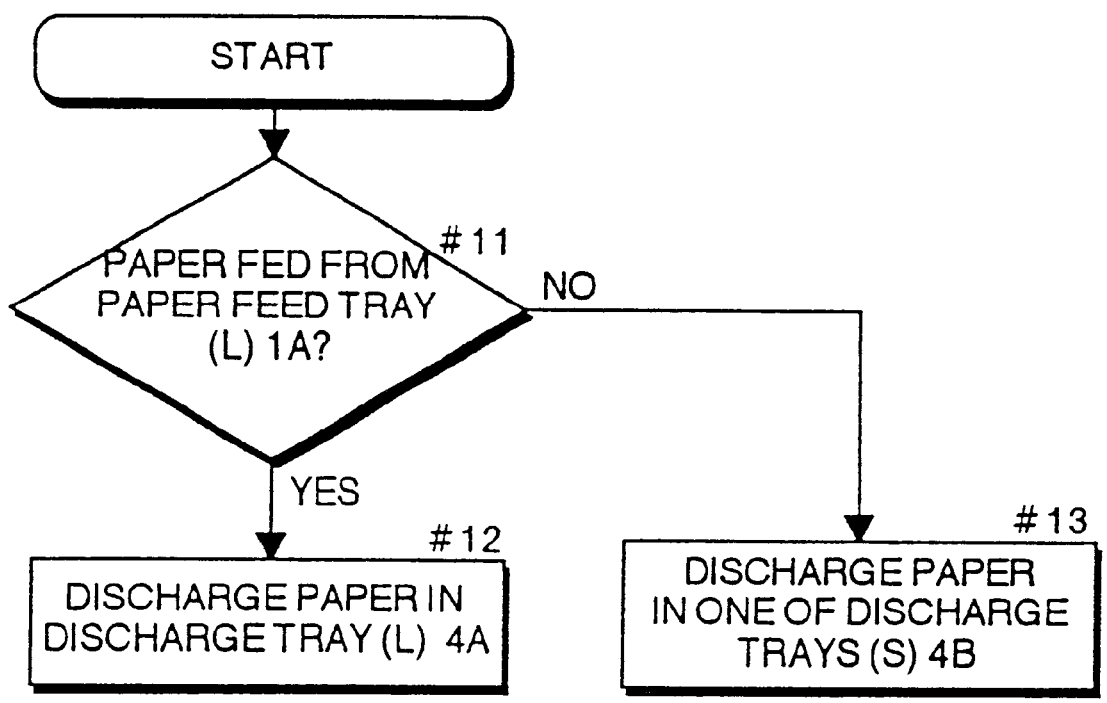
FIG. 22 is a flow chart for paper discharge control in the printer shown in FIG. 18 to FIG. 21 above.
Figure 29:
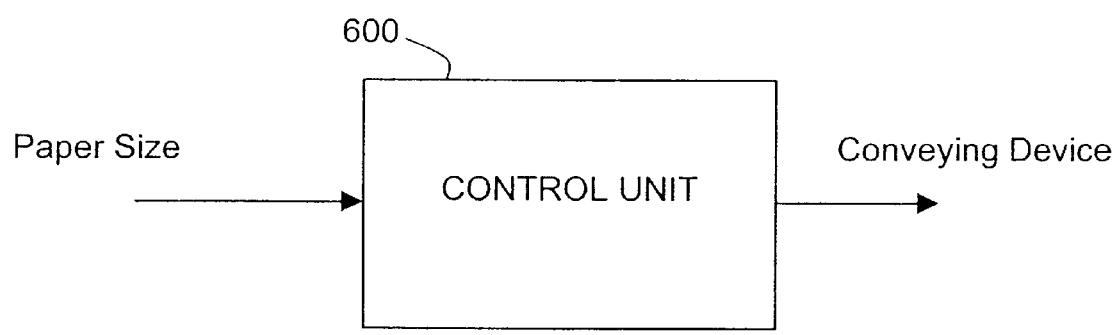
FIG. 29 is an illustration of a controller according to the present invention.

FIG. 22 shows a flow chart of the paper discharge control in the printer according to the fourteenth to seventeenth embodiments. The control unit 600 (shown in FIG. 29) provided on the printer checks whether the paper is fed from the paper feed unit (large) 1 or not (#11), and if it is YES, it discharges paper to the discharge tray (large) 4A (#12), while if it is NO, it discharges paper to any of the discharge tray (small) 4B (#13).

Figure 23:
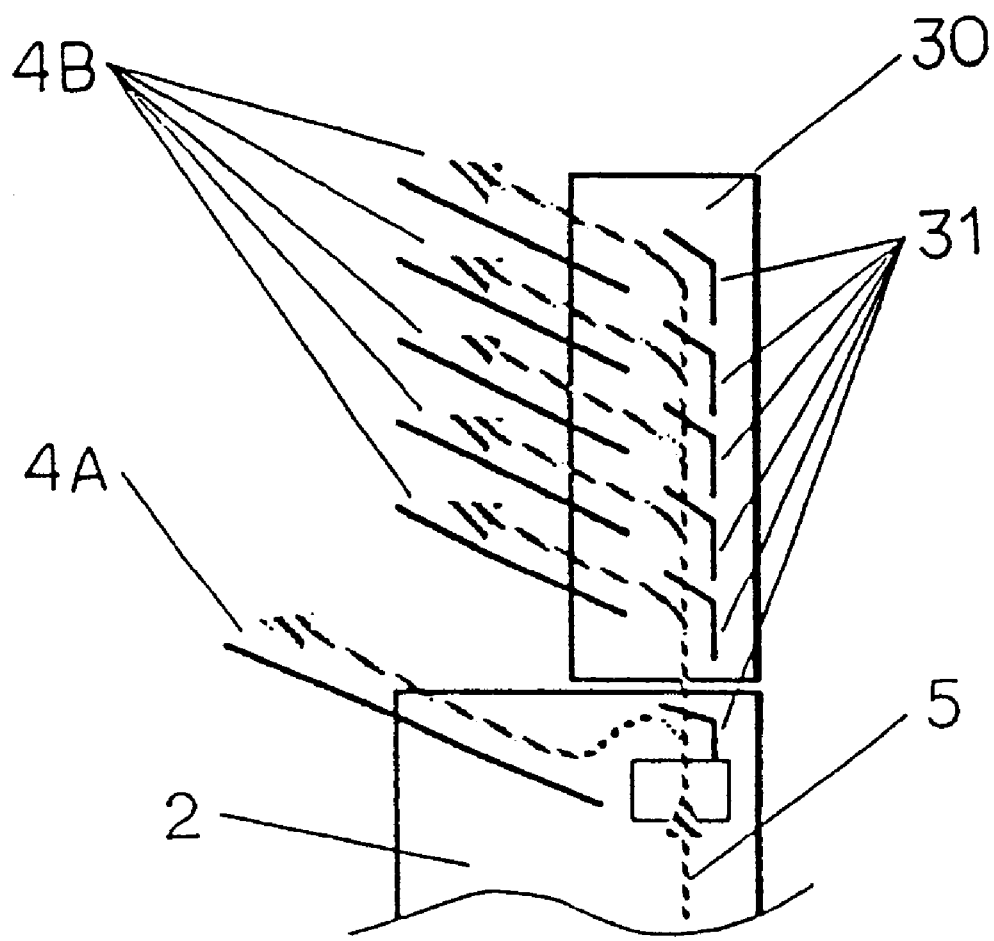
FIG. 23 is a constitution view of the discharge tray in the printer according to the nineteenth embodiment of the invention.
Figure 24:
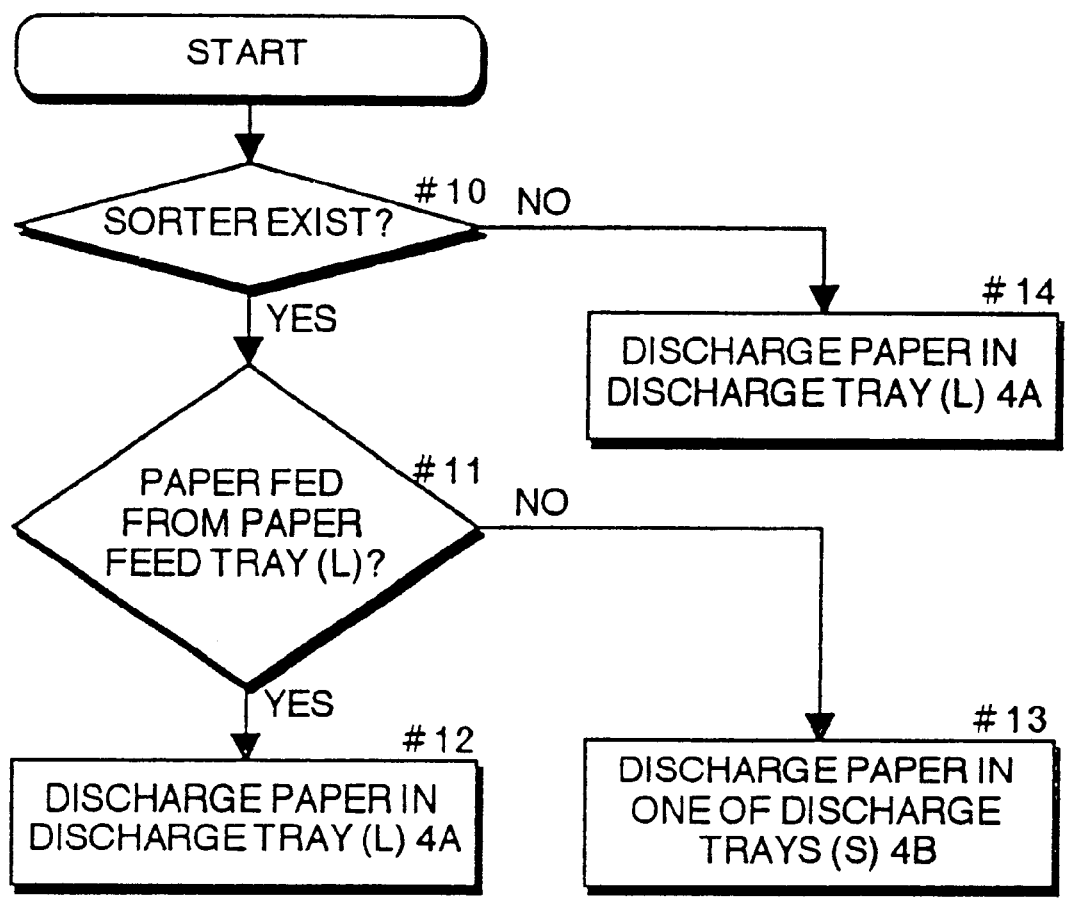
FIG. 24 is a flow chart for paper discharge control in the printer shown in FIG. 23 above.

FIG. 23 shows the printer according to the nineteenth embodiment. In this embodiment, the discharge tray (large) 4A is provided on the printing unit 2, and the discharge tray (small) 4B is provided on the sorter 30 which is detachably attached to the upper part of the printing unit 2. The length of the discharge tray is: the discharge tray (large) 4A>the discharge tray (small) 4B. The paper which is discharged from the paper feed unit is led through the printing unit 2, and automatically distributed to the discharge tray (small) 4B and the discharge tray (large) 4A to meet the paper size by the distributor 31. FIG. 24 shows a flow chart of the paper discharge control in the printer of FIG. 23. The control unit 600 checks whether there is a sorter 30 or not (#10), and if NO, it discharges paper to the discharge tray (large) 4A (#14), while if it is YES, it examines whether it is the paper fed from the paper feed unit (large) or not (#11), and the subsequent steps are same as above.

Figure 25:
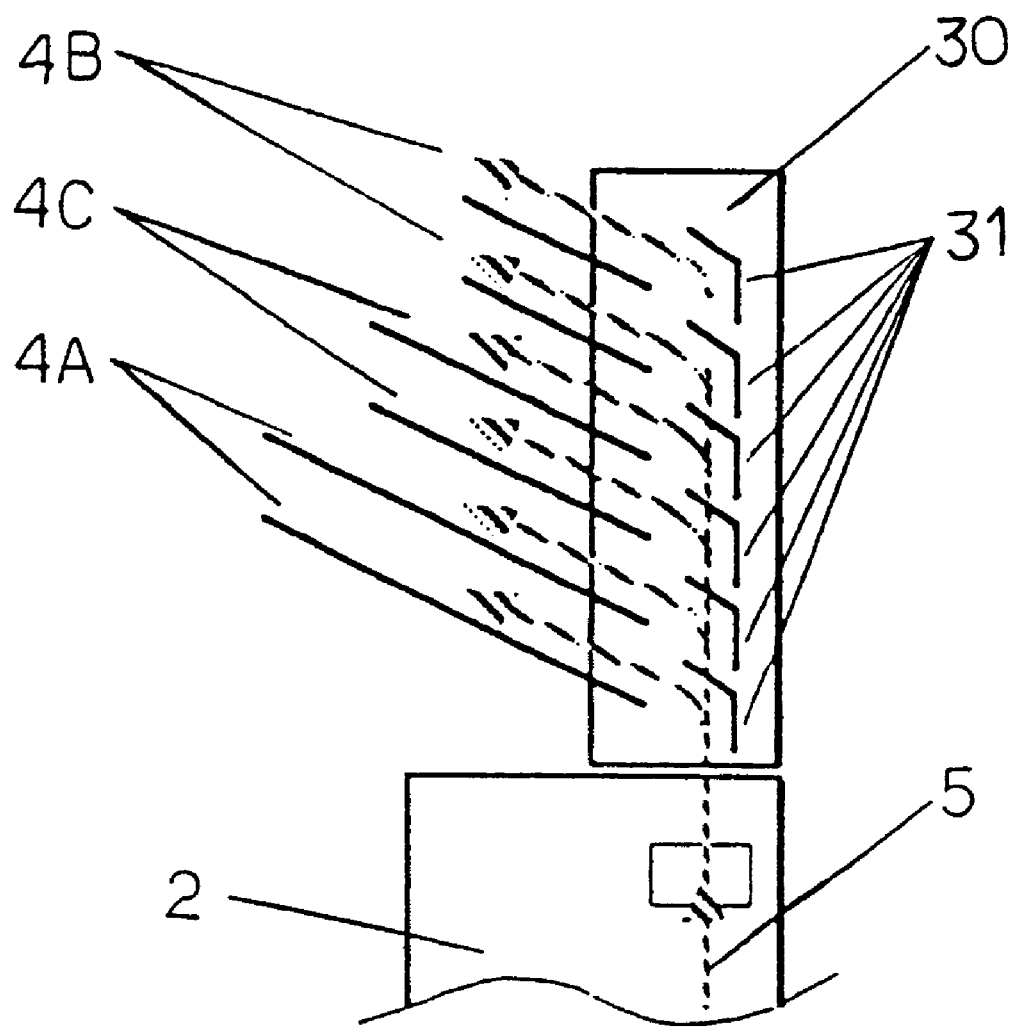
FIG. 25 is a constitution view of the discharge tray in the printer according to the twentieth embodiment of the invention.
Figure 26:
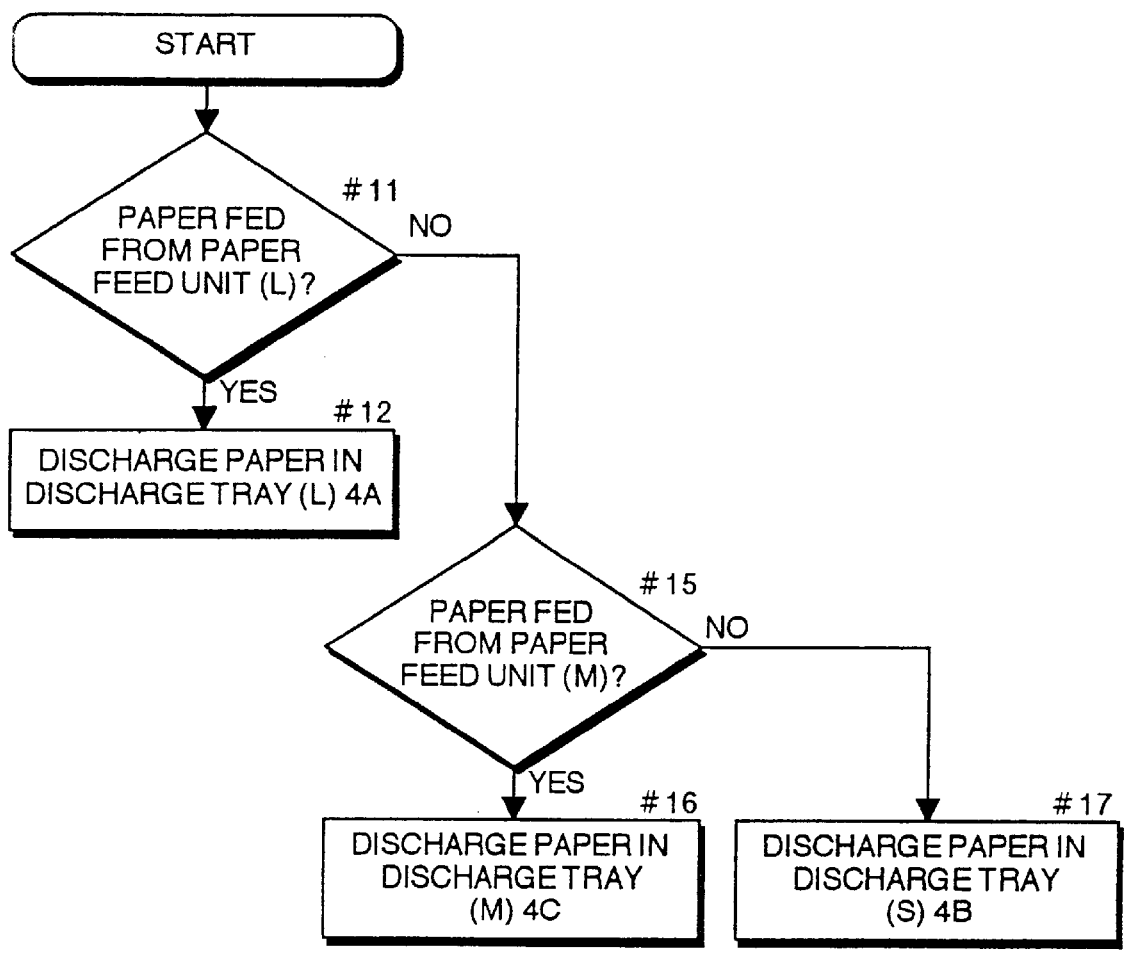
FIG. 26 is a flow chart for paper discharge control in the printer shown in FIG. 25 above.

FIG. 25 shows an example of constitution of the discharge tray of the printer according to the twentieth embodiment. The discharge tray has three stages of length. The length of the discharge tray is: the discharge tray (large) 4A>discharge tray (medium) 4C>discharge tray (small) 4B. The paper which is discharged from the paper feed unit is led through the printing unit 2, and automatically distributed to the discharge tray to meet the paper size by the distributor 31. FIG. 26 shows a flow chart of the paper discharge control in the printer of FIG. 25. The control unit 600 checks whether it is the paper fed from the paper feed unit (large) or not (#11), and if it is YES, it discharges paper to the discharge tray (large).4A (#12), while if NO, it examines whether it is the paper fed from the paper feed unit (medium) or not (#15), and if it is YES, it discharges paper to the discharge tray (medium) 4C (#16), while if NO, it discharges paper to the discharge tray (small) 4B (#17).

Figure 27:
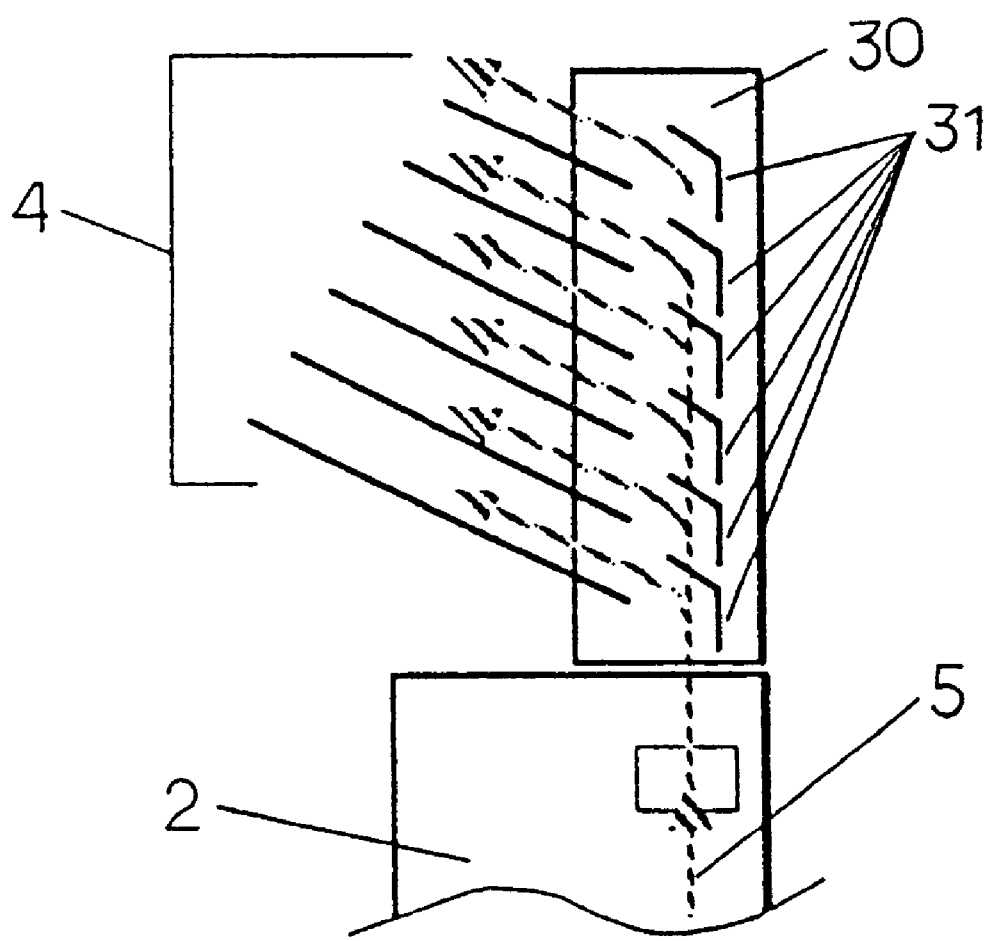
FIG. 27 is a constitution view of the discharge tray in the printer according to the twenty-first embodiment of the invention.
Figure 28:
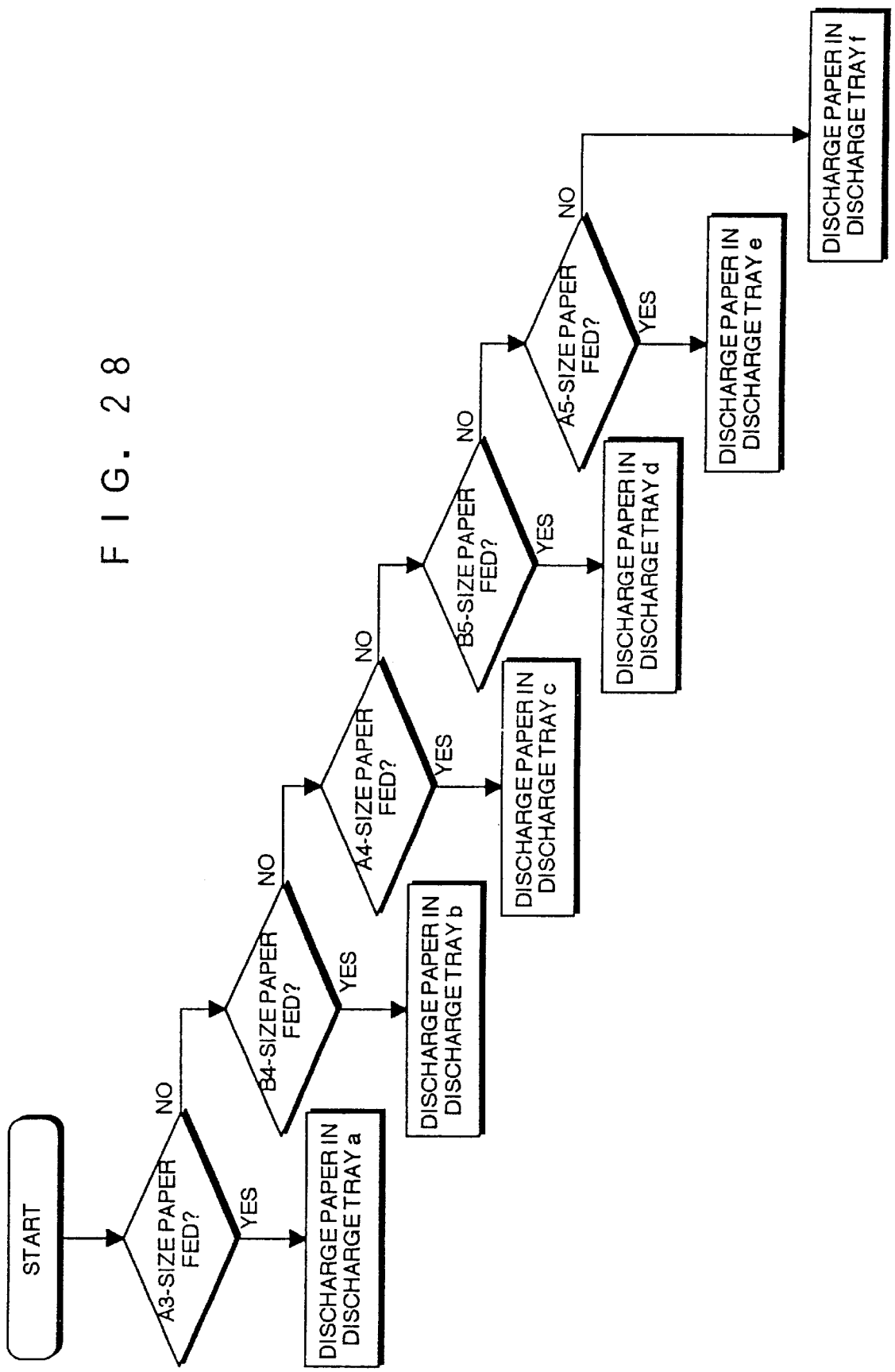
FIG. 28 is a flow chart for paper discharge control in the printer shown in FIG. 27 above.

FIG. 27 shows a constitution example of the discharge trays of the printer according to the twenty-first embodiment. The discharge trays 4 have all different lengths. The lengths of the tray are the largest in the lowermost stage, the smaller to the upper stage, and the smallest in the uppermost stage. The paper which is discharged from the paper feed unit is led through the printing unit 2, and automatically distributed to the discharge tray to meet the paper size by the distributor 31. FIG. 28 shows a flow chart of the paper discharge control in the printer of FIG. 27. In this case, the sizes of the paper to be fed are classified into A3, B4, A4, B5, A5, postcard, and envelope. The discharge trays are marked with a, b, c, d, e, f in order from the lowermost stage to upward.

The present invention is not limited to the constitution of the above embodiments but may be subjected to various modifications within the scope not to change of purport of the invention.

What is claimed is:

1. An image producing apparatus wherein a paper feed unit and a paper stack are arranged in a vertical direction, comprising:

an image producing unit that produces images on paper, the image producing unit having a front face and a back side, opposed to the front face, and a depth direction of the image producing unit extending in a direction parallel to from the front face to the back side;

a paper feed unit that includes a plurality of paper feed trays arranged in the depth direction of the image producing apparatus and is located in a vertical direction to the image producing unit, each paper feed tray being operable to contain the paper in the vertical direction and to feed the paper to the image producing unit; and, a paper stack which is located in a vertical direction of the image producing unit, and is operable to contain the paper discharged from the image producing unit.

2. The image producing apparatus as claimed in claim 1, wherein the image producing unit is located above the paper feed unit, and the paper stack is located above the image producing unit.

3. The image producing apparatus as claimed in claim 1, wherein the paper stack is longer in the depth direction than the image producing unit.

4. The image producing apparatus as claimed in claim 1, wherein the paper stack is longer in the depth direction than the paper feed unit.

5. An image producing apparatus as claimed in claim 1, wherein the paper stack comprising:

a first unit which has a first tray for containing the paper, and a paper conveying unit for receiving the paper discharged from the image producing unit, and conveying the paper to said first tray, or conveying the paper upward and downward; and, a second unit which has a second tray for containing the paper, and a paper conveying unit for receiving the paper discharged from the first unit, and conveying the paper to said second tray, wherein said second unit is detachably disposed above said-first unit.

6. An image producing apparatus as claimed in claim 5, wherein the second unit further comprises another paper conveying unit for vertically discharging the paper received from the first unit, and the paper stack further comprises a third unit which has a third tray for containing the paper, and a paper conveying unit for receiving the paper discharged from the second unit, and conveying the paper to said third tray, and, wherein said third unit is detachably disposed above said second unit.

7. An image producing apparatus as claimed in claim 1, wherein the paper stack has a plurality of trays for containing the paper to be discharged, and corners of said trays have notches into which corners of the contained paper are projected.

8. An image producing apparatus as claimed in claim 7, wherein the paper stack has a cover which covers side surfaces of the trays along with the paper conveying direction, wherein said cover is structured such that a side for covering the notched parts of the trays is shorter than the other sides.

9. An image producing apparatus as claimed in claim 8, wherein the cover is furnished with notches for opening out the upper surfaces of the trays.

10. An image producing apparatus as claimed in claim 7, wherein the paper stack has a device for thrusting a paper which is loaded on the tray.

11. The image producing apparatus as claimed in claim 1, wherein the paper feed unit comprises box-shaped paper feed trays which have an opening at tops thereof.

12. An image producing apparatus as claimed in claim 11, wherein the paper stack has covers which cover the paper feed trays, and wherein said covers are openable toward a front.

13. An image producing apparatus as claimed in claim 11, wherein the paper feed trays are rotatable toward a front pivoting around bottoms thereof.

14. The image producing apparatus as claimed in claim 1, wherein said paper feed unit includes a front door which can be opened forward, and wherein said plurality of paper feed trays are arranged inside said front door.

15. The image producing apparatus as claimed in claim 14, wherein each of said plurality of paper feed trays is rotatable forward in a direction of the front face on an axis of near a bottom part of each paper feed tray, and wherein each respective tray falls forward with inclination when said front door is opened.

16. The image producing apparatus as claimed in claim 1, wherein each of said plurality of paper feed trays has an opening through which the paper can be inserted at the top surface.

17. The image producing apparatus as claimed in claim 1, wherein each of said plurality of paper feed trays is rotatable forward in a direction of the front face on an axis of near a bottom part of each paper feed tray.

18. The image producing apparatus as claimed in claim 1, a paper feed tray for containing larger size of paper is arranged behind the paper feed tray for containing normal size of paper, in the depth direction.

19. A method for arranging a paper feed unit and a paper stack in a vertical direction in an image producing apparatus, the image producing apparatus having a front face and a back side, opposed to the front face, and a depth direction of the image producing apparatus extending in a direction parallel to from the front face to the back side, comprising the steps of:

arranging a plurality of paper feed trays in the depth direction of the image producing apparatus and in a vertical direction with respect to the image producing unit, each of said plurality of paper feed trays being operable to contain paper in the vertical direction and feed the paper to the image producing unit; and, arranging a paper stack in a vertical direction with respect to the image producing unit, the paper stack being operable to hold the paper which is discharged from the image producing unit.

20. An image producing apparatus comprising:

an image producing unit that produces an image on paper fed from the paper feed unit, the image producing unit having a front face and a back side, opposed to the front face, and a depth direction of the image producing unit extending in a direction parallel to from the front face to the back side;

a paper feed unit that is arranged in a vertical direction with respect to the image producing unit and includes a plurality of paper feed trays arranged in the depth direction of the image producing apparatus;

a paper stack that is arranged in the vertical direction and consists of a plurality of paper stacking trays arranged in upward and downward directions, a paper conveying path operable to convey the paper discharged from the image producing unit to each paper stacking tray of said plurality of paper stacking trays, and a paper conveying device that is operable to convey the paper discharged from the image producing unit; and a control device that is operable to specify one of said plurality of paper stacking trays in response to a paper size, and controls the paper conveying device so as to convey the paper into the specified paper stacking tray.

21. The image producing apparatus as claimed in claim 20, wherein the control device executes a control such that the paper conveying device conveys the larger-sized paper into a paper stacking tray which is larger than another paper stacking tray.

* * * * *

UNITED STATES PATENT AND TRADEMARK OFFICE
CERTIFICATE OF CORRECTION

PATENT NO.    : 6,371,476 B2
DATED         : April 16, 2002
INVENTOR(S)   : Yoshitaka Isogai et al.

It is certified that error appears in the above-identified patent and that said Letters Patent is hereby corrected as shown below:

<u>Title page,</u>
Item [*] Notice:, please add at the beginning -- This patent issued on a continued prosecution application filed under 37 CFR 1.53(d), and is subject to the twenty year patent term provisions of 35 U.S.C. 154(a)(2). --

Signed and Sealed this

Fourth Day of February, 2003

JAMES E. ROGAN
*Director of the United States Patent and Trademark Office*